US011425111B2

(12) United States Patent
Smith et al.

(10) Patent No.: US 11,425,111 B2
(45) Date of Patent: Aug. 23, 2022

(54) ATTESTATION TOKEN SHARING IN EDGE COMPUTING ENVIRONMENTS

(71) Applicant: Intel Corporation, Santa Clara, CA (US)

(72) Inventors: Ned M. Smith, Beaverton, OR (US); John J. Browne, Limerick (IE); Kapil Sood, Portland, OR (US); Francesc Guim Bernat, Barcelona (ES); Kshitij Arun Doshi, Tempe, AZ (US); Rajesh Poornachandran, Portland, OR (US); Tarun Viswanathan, Folsom, CA (US); Manish Dave, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 16/683,410

(22) Filed: Nov. 14, 2019

(65) Prior Publication Data

US 2020/0084202 A1 Mar. 12, 2020

Related U.S. Application Data

(60) Provisional application No. 62/767,259, filed on Nov. 14, 2018, provisional application No. 62/773,864, filed on Nov. 30, 2018.

(51) Int. Cl.
*H04L 9/40* (2022.01)
*H04L 41/5003* (2022.01)
*H04W 12/06* (2021.01)

(52) U.S. Cl.
CPC ...... *H04L 63/0815* (2013.01); *H04L 41/5003* (2013.01); *H04W 12/06* (2013.01)

(58) Field of Classification Search
CPC . H04L 63/0815; H04L 41/5003; H04L 67/12; H04L 67/28; H04L 67/10; H04L 63/0807; H04W 12/06; H04W 12/08
See application file for complete search history.

(56) References Cited

U.S. PATENT DOCUMENTS

| 2018/0075231 A1* | 3/2018 | Subramanian | .......... G06F 16/86 |
| 2018/0212962 A1* | 7/2018 | Reznik | .................. H04W 12/06 |

(Continued)

OTHER PUBLICATIONS

"Implicit Identity Based Device Attestation", TCG Published, (Mar. 5, 2018), 18 pgs.

(Continued)

*Primary Examiner* — Henry Tsang
(74) *Attorney, Agent, or Firm* — Schwegman Lundberg & Woessner, P.A.

(57) ABSTRACT

Various approaches for implementing attestation using an attestation token are described. In an edge computing system deployment, an edge computing device includes an attestable feature (e.g., resource, service, entity, property, etc.) which is accessible from use of an attestation token, by the operations of: obtaining a first instance of a token that provides proof of attestation for an accessible feature of the edge computing device, with the token including data to indicate trust level designations for the feature as attested by an attestation provider; receiving, from a prospective user of the feature, a request to use the feature and a second instance of the token, with the second instance of the token originating from the attestation provider; and providing access to the feature based on a verification of the instances of the token, by using the verification to confirm attestation of the trust level designations for the feature.

25 Claims, 15 Drawing Sheets

(56) References Cited

U.S. PATENT DOCUMENTS

2019/0026450 A1* 1/2019 Egner .................... G06F 21/44
2020/0117730 A1* 4/2020 Vaswani ............. G06F 16/2358
2020/0134620 A1* 4/2020 Aiello ................. G06Q 20/401

OTHER PUBLICATIONS

"Remote Attestation Procedures (rats)", [Online]. Retrieved from the Internet: URL: https://datatracker.ietf.org/wg/ratsabout Accessed on Nov. 15, 2019, (2019), 4 pgs.
Birkholz, H, "Remote Attestation Procedures Architecture", Network working group, (Sep. 12, 2019), 14 pgs.
Huh, Jun Ho, "Trustworthy Distributed Systems through Integrity-Reporting", Guide to e-Science: Next Generation Scientific Research and Discovery Oxford University Computing Laboratory, (Apr. 2011), 35 pgs.
Mandyam G, "The Entity Attestation Token (EAT)", Rats Working Group, (Jul. 4, 2019), 28 pgs.
Oliver Ian, "Distributed NFV Attestation and VNF Supply Chain Trustworthiness and Integrity", Security Research Nokia Bell Labs, (Jun. 14, 2018), 7 pgs.
Sporny Manu, "Verifiable Credentials Data Model 1.0", [Online]. Retrieved from the Internet: URL: http://www.w3.org/TR/vc-data-model , (Sep. 5, 2019), 136 pgs.
Watsen, K, "A Voucher Artifact for Bootstrapping Protocols", Internet Engineering Task Force (IETF), (May 2018), 23 ogs.

* cited by examiner

ATTESTATION TOKEN SHARING IN EDGE COMPUTING ENVIRONMENTS

PRIORITY CLAIM

This application claims the benefit of priority to the following provisional applications: U.S. Provisional Patent Application Ser. No. 62/767,259, filed Nov. 14, 2018, and titled "ATTESTATION TOKEN SHARING USING A SINGLE SIGN ON (SSO) INFRASTRUCTURE;" and U.S. Provisional Patent Application Ser. No. 62/773,864, filed Nov. 30, 2018, and titled "ATTESTATION TOKEN SHARING USING A SINGLE SIGN ON (SSO) INFRASTRUCTURE." Both of these provisional patent applications are incorporated herein by reference in their entireties.

TECHNICAL FIELD

Embodiments described herein generally relate to data processing, network communication, and communication system implementations, and in particular, to techniques for conducting attestation, verification, and security operations in respective endpoint devices and systems connected in edge computing and Internet of Things (IoT) device networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing use cases in mobile network settings have been developed for integration with multi-access edge computing (MEC) approaches, also known as "mobile edge computing." MEC approaches are designed to allow application developers and content providers to access computing capabilities and an information technology (IT) service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. However, the integration of mobility and dynamically launched services to some mobile use and device processing use cases has led to limitations and concerns with orchestration, functional coordination, and resource management, especially in complex mobility settings where many participants (devices, hosts, tenants, service providers, operators) are involved.

In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, MEC, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues. One such challenge is in relation to security and trust, and the ability to establish trusted computing relationships and domains. As trusted computing concepts have become increasingly implemented within computing systems and deployments, the use cases for attestation, trust claims, and trust proofs has expanded, to improve operations with trusted entities (or conversely, to exclude or protect from untrusted entities).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
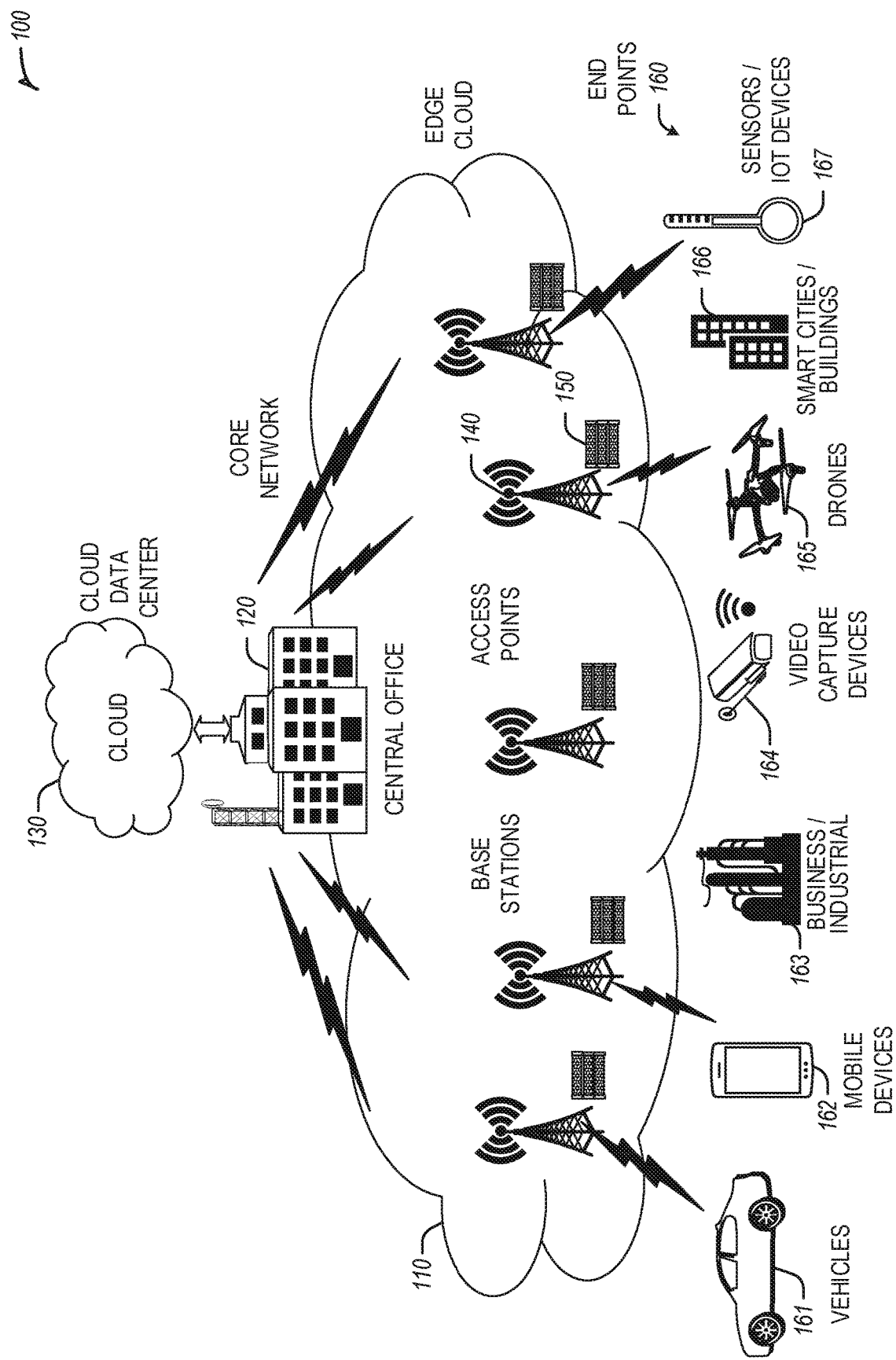
FIG. 1 illustrates an overview of an edge cloud configuration for edge computing, according to an example.

In the following description, methods, configurations, and related apparatuses are disclosed for management of an attestation state of a device or entity using a token-based data structure, in a manner similar to the deployment and distribution of a single-sign-on (SSO) authentication state token. The following examples introduce specific attestation token generation, distribution, and usage operations in a networked device setting. These examples enable increased security, reliability, and control of device operations, while introducing a new mechanism for identifying trust and operational characteristics while maintaining attestation context and state across multiple service providers.

Applicability of Attestation Techniques

The present attestation techniques may be coordinated and monitored in a variety of device and computing system deployment environments involving the edge computing/edge cloud deployments, Internet of Things (IoT) networks, Multi-Access Edge Computing (MEC) systems, network function virtualization (NFV) implementations, and other aspects of networking technologies.

For example, in an MEC-based edge computing environment, MEC workflows often involve a tenant workload origination node as well as an orchestration node having to maintain attestation context/state across multiple service provider nodes. A challenge exists in getting the attestation context/state distributed to all the other nodes in the MEC system involved in the workflow/workload processing. One of the present examples involves using a single-sign-on (SSO) server such as OAuth2, SAML or Kerberos, to distribute this attestation context/state to relevant entities in the system, where the object contained in the SSO payload is an attestation token (in contrast to a conventional use of an authentication key or authentication data that is typically passed via SSO payloads).

Additionally, in further examples, authentication tokens and keys may be deployed as part of a system solution where the authentication token/key reference is included as a trust claim within the attestation token. The verifier(s) then may verify not only the trust claims suitable for hosting a particular workload, but also that the authentication key/token itself is protected by a suitable, verified execution environment.

As a brief comparison with conventional approaches, existing types of IoT deployments and hardware manufacturers typically attempt to address attestation as part of a configuration or setup prerequisite. For instance, the Open Connectivity Foundation (OCF) IoT standard has defined attestation as part of device onboarding such that attestation may be performed as a pre-requisite to an IoT network issuing a local device identity. As another example, the OCP Cerberus project has attempted to perform firmware and operating system image verification of all images of a cloud platform prior to boot. As still another example, the Trusted Computing Group (TCG) has defined attestation as an adjunct to a certificate signing request (CSR) exchange such that the certificate to be issued may be issued contingent on the verification of attestation attributes shared during the CSR exchange. TCG has also defined implicit attestation using hardware techniques, such as where a portion of the trusted computing base (TCB) environment that performs attestation exchanges also determines the attestation key pair.

These conventional approaches of setup-based attestation lack the ability to generate or distribute a token that represents the attestation verification event, or place a time limit on a token where expiration of the token would necessarily prompt re-attestation. Existing approaches for attestation also do not allow sharing of attestation results with multiple orchestration entities that would cause the verification of an attestation policy compliance prior to resource usage (e.g., prior to assignment of services or resources under a service level agreement (SLA) that guarantees availability of services or resources).

The following techniques disclose use of an attestation approach applicable to endpoint, IoT, MEC, edge, and cloud computing environments, which introduces attestation tokens as a new feature usable in data structures, API parameters or other context structures, for attestation of accessible system features. The existence of attestation tokens, and the use of attestation protocols that issue, revoke, verify tokens, provide a verifiable procedure of determining the authenticity of a particular feature (whether the feature is a device, resource, service, entity, property, or like item).

With the present attestation techniques, a service or resource feature that is operable in an IoT, Edge/MEC, cloud or other IT environment may, as a condition of operation, be required to attest to an attestation service provider (ASP) for use within a given domain or network. The following techniques describe the use of 'attestation token' or 'attestation single-sign-on' infrastructure servers or services, in connection with use of this ASP, and suitable steps of managing trust and verifications for the accessed service or resource feature, usage of the token, and the associated attestations.

In an example, the ASP may issue attestation tokens that may be returned to the service or resource feature, or that may be delivered directly to an orchestration service provider (e.g., an edge computing system orchestrator) or to clients (e.g., an edge computing system client device, such as a user equipment (UE) client). The attestation token may have an expiration date or validity period determined appropriate for the domain, where expiry of the token may trigger a re-attestation and subsequent re-issuance of the attestation token. In addition, in further examples, the attestation token together with the entities' identity and token metadata (identifying whether the entity is a service, network virtual network function (VNF), UE, customer, etc.) can be placed on a public blockchain, accessible by orchestrators, authenticating parties, regulatory/administrators, and the like.

With the present techniques and configurations, the period in which re-attestation is needed may be controlled independently of the identity of a given service provider or resource. This allows greater flexibility in responding to dynamic threats or customer perceived value realized from more frequent attestation checking. The presently described attestation tokens can be more conveniently carried by existing data structures or can be included with network API definitions (such as JavaScript Object Notation (JSON)) as extensions to be more easily integrated into Edge/MEC, IoT, Cloud and enterprise applications. Attestation tokens can be carried by orchestrators, clients, SLA communications or among other data structures and participants, as needed, to allow their use in the context of a normal workflow. The checking of tokens can be applied upon use to detect any change in attestation state subsequent to state at token issuance.

The present techniques and configurations may be utilized in connection with many aspects of current networking systems, but are provided with reference to Edge Cloud, IoT, Multi-access Edge Computing (MEC), and other distributed computing deployments. The following systems and techniques may be implemented in, or augment, a variety of distributed, virtualized, or managed edge computing systems. These include environments in which network services are implemented or managed using multi-access edge computing (MEC) or 4G/5G wireless network configurations; or in wired network configurations involving fiber, copper, and other connections. Further, aspects of processing by the respective computing components may involve computational elements which are in geographical proximity of a user equipment or other endpoint locations, such as a smartphone, vehicular communication component, IoT device, etc. Further, the presently disclosed techniques may relate to other Edge/MEC/IoT network communication standards and configurations, and other intermediate processing entities and architectures.

Example Edge Computing Architectures

FIG. 1 is a block diagram 100 showing an overview of a configuration for edge computing, which includes a layer of processing referenced in many of the current examples as an "edge cloud". This network topology, which may include a number of conventional networking layers (including those not shown herein), may be extended through use of the attestation techniques and network configurations discussed herein.

As shown, the edge cloud 110 is co-located at an edge location, such as the base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained.

Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may involve the use of attestation, as provided in the discussion below.

In contrast to the network architecture of FIG. 1, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 2:
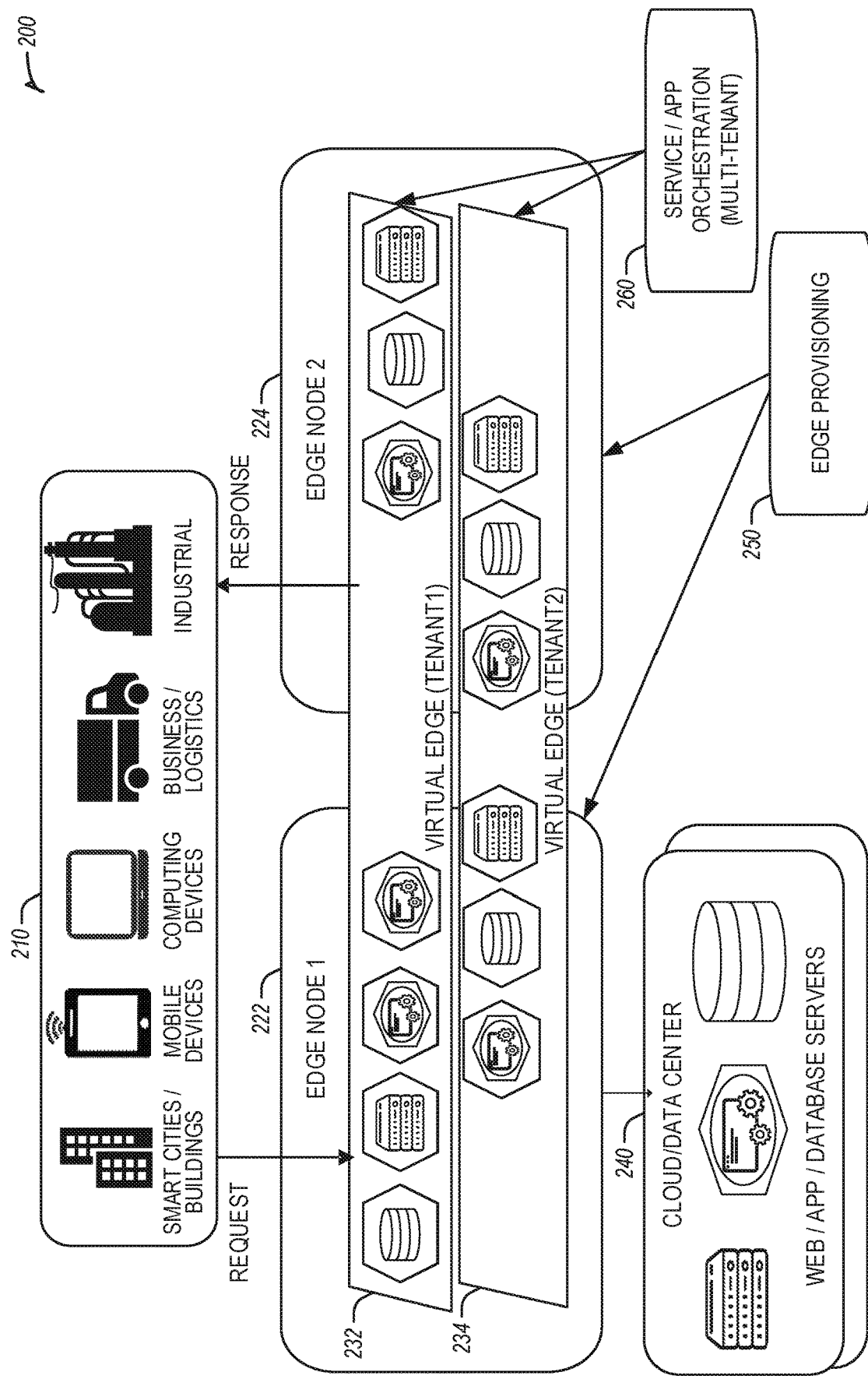
FIG. 2 illustrates deployment and orchestration for virtual edge configurations across an edge computing system operated among multiple edge nodes and multiple tenants, according to an example.

FIG. 2 illustrates deployment and orchestration for virtual edge configurations across an edge computing system operated among multiple edge nodes and multiple tenants. Specifically, FIG. 2 depicts coordination of a first edge node 222 and a second edge node 224 in an edge computing system 200, to fulfill requests and responses for various client endpoints 210 from various virtual edge instances. The virtual edge instances provide edge compute capabilities and processing in an edge cloud, with access to a cloud/data center 240 for higher-latency requests for websites, applications, database servers, etc. Thus, the edge cloud enables coordination of processing among multiple edge nodes for multiple tenants or entities.

In the example of FIG. 2, these virtual edge instances include: a first virtual edge 232, offered to a first tenant (Tenant 1), which offers a first combination of edge storage, computing, and services; and a second virtual edge 234, offering a second combination of edge storage, computing, and services, to a second tenant (Tenant 2). The virtual edge instances 232, 234 are distributed among the edge nodes 222, 224, and may include scenarios in which a request and response are fulfilled from the same or different edge nodes. The configuration of each edge node 222, 224 to operate in a distributed yet coordinated fashion occurs based on edge provisioning functions 250. The functionality of the edge nodes 222, 224 to provide coordinated operation for applications and services, among multiple tenants, occurs based on orchestration functions 260.

It should be understood that some of the devices in 210 are multi-tenant devices where Tenant1 may function within a Tenant1 'slice' while a Tenant2 may function within a Tenant2 slice. A trusted multi-tenant device may further contain a tenant specific cryptographic key such that the combination of key and slice may be considered a "root of trust" (RoT) or tenant-specific RoT. A RoT may further be computed dynamically composed using a security architecture, such as a DICE (Device Identity Composition Engine) architecture where a DICE hardware building block is used to construct layered trusted computing base contexts for layering of device capabilities (such as a Field Programmable Gate Array (FPGA)). The RoT also may be used for a trusted computing context to support respective tenant operations, etc. Use of this RoT and the security architecture may be enhanced by the attestation operations further discussed herein.

Edge computing nodes may partition resources (memory, CPU, GPU, interrupt controller, I/O controller, memory controller, bus controller, etc.) where each partition may contain a RoT capability and where fan-out and layering according to a DICE model may further be applied to edge nodes. Cloud computing nodes consisting of containers, FaaS (function as a service) engines, servlets, servers, or other computation abstraction may be partitioned according to a DICE layering and fan-out structure to support a RoT context for each. Accordingly, the respective RoTs spanning entities 210, 222, and 240 may coordinate the establishment of a distributed trusted computing base (DTCB) such that a tenant-specific virtual trusted secure channel linking all elements end-to-end can be established.

Additionally, the edge computing system may be extended to provide orchestration of multiple applications through the use of containers (a contained, deployable unit of software that provides code and needed dependencies), in a multi-owner, multi-tenant environment. A multi-tenant orchestrator may be used to perform key management, trust anchor management, and other security functions related to the provisioning and lifecycle of the trusted 'slice' concept in FIG. 2. An orchestrator may use a DICE layering and fan-out construction to create a root of trust context that is tenant-specific. Thus, orchestration functions, provided by an orchestrator, may participate as a tenant-specific orchestration provider.

Accordingly, an edge computing system may be configured to fulfill requests and responses for various client endpoints from multiple virtual edge instances (and, from a cloud or remote data center, not shown). The use of these virtual edge instances supports multiple tenants and multiple applications (e.g., AR/VR, enterprise applications, content delivery, gaming, compute offload) simultaneously. Further, there may be multiple types of applications within the virtual edge instances (e.g., normal applications, latency sensitive applications, latency critical applications, user plane applications, networking applications, etc.). The virtual edge instances may also be spanned across systems of multiple owners at different geographic locations.

In further examples, edge computing systems may deploy containers in an edge computing system. As a simplified example, a container manager is adapted to launch containerized pods, functions, and functions-as-a-service instances through execution via compute nodes, or to separately execute containerized virtualized network functions through execution via compute nodes. This arrangement may be adapted for use by multiple tenants in system arrangement, where containerized pods, functions, and functions-as-a-service instances are launched within virtual machines specific to each tenant (aside the execution of virtualized network functions).

Within the edge cloud, a first edge node 222 (e.g., operated by a first owner) and a second edge node 224 (e.g., operated by a second owner) may operate or respond to a container orchestrator to coordinate the execution of various applications within the virtual edge instances offered for respective tenants. For instance, the edge nodes 222, 224 may be coordinated based on edge provisioning functions 250, while the operation of the various applications are coordinated with orchestration functions 260.

Various system arrangements may provide an architecture that treats VMs, Containers, and Functions equally in terms of application composition (and resulting applications are combinations of these three ingredients). Each ingredient may involve use of one or more accelerator (e.g., FPGA, ASIC) components as a local backend. In this manner, applications can be split across multiple edge owners, coordinated by an orchestrator.

Figure 3:
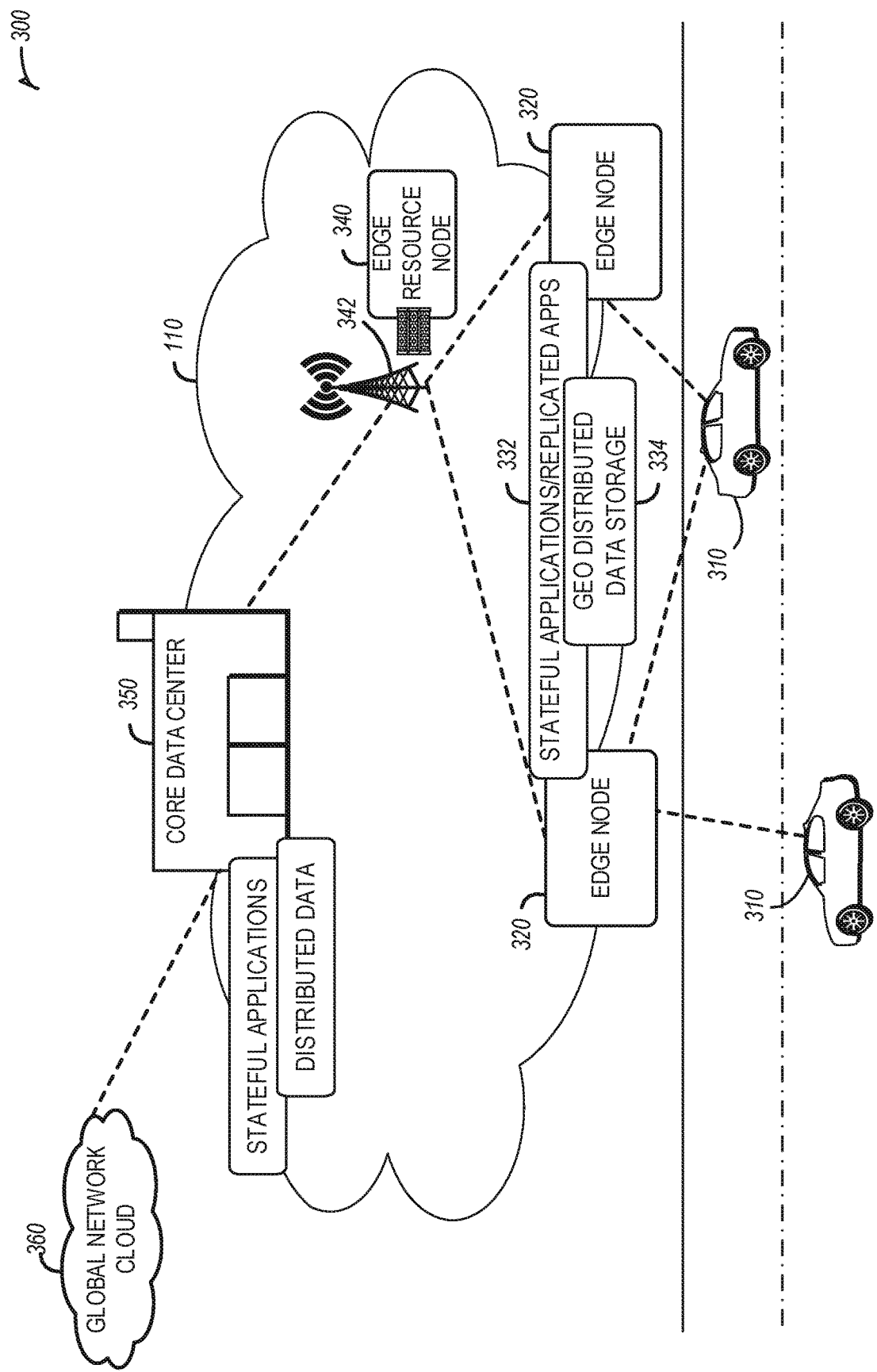
FIG. 3 illustrates a vehicle compute and communication use case involving mobile access to applications in an edge computing system, according to an example.

It should be appreciated that the edge computing systems and arrangements discussed herein may be applicable in various solutions, services, and/or use cases. As an example, FIG. 3 shows a simplified vehicle compute and communication use case involving mobile access to applications in an edge computing system 300 that implements an edge cloud 110. In this use case, each client compute node 310 may be embodied as in-vehicle compute systems (e.g., in-vehicle navigation and/or infotainment systems) located in corresponding vehicles that communicate with the edge gateway nodes 320 during traversal of a roadway. For instance, edge gateway nodes 320 may be located in roadside cabinets, which may be placed along the roadway, at intersections of the roadway, or other locations near the roadway. As each vehicle traverses along the roadway, the connection between its client compute node 310 and a particular edge gateway node 320 may propagate so as to maintain a consistent connection and context for the client compute node 310. Each of the edge gateway nodes 320 includes some processing and storage capabilities and, as such, some processing and/or storage of data for the client compute nodes 310 may be performed on one or more of the edge gateway nodes 320.

Each of the edge gateway nodes 320 may communicate with one or more edge resource nodes 340, which are illustratively embodied as compute servers, appliances or components located at or in a communication base station 342 (e.g., a base station of a cellular network). As discussed above, each edge resource node 340 includes some processing and storage capabilities and, as such, some processing and/or storage of data for the client compute nodes 310 may be performed on the edge resource node 340. For example, the processing of data that is less urgent or important may be performed by the edge resource node 340, while the processing of data that is of a higher urgency or importance may be performed by edge gateway devices or the client nodes themselves (depending on, for example, the capabilities of each component).

The edge resource node(s) 340 also communicate with the core data center 350, which may include compute servers, appliances, and/or other components located in a central location (e.g., a central office of a cellular communication network). The core data center 350 may provide a gateway to the global network cloud 360 (e.g., the Internet) for the edge cloud 110 operations formed by the edge resource node(s) 340 and the edge gateway nodes 320. Additionally, in some examples, the core data center 350 may include an amount of processing and storage capabilities and, as such, some processing and/or storage of data for the client compute devices may be performed on the core data center 350 (e.g., processing of low urgency or importance, or high complexity). The edge gateway nodes 320 or the edge resource nodes 340 may offer the use of stateful applications 332 and a geographic distributed data storage 334 (e.g., database, data store, etc.).

In further examples, FIG. 3 may utilize various types of mobile edge nodes, such as an edge node hosted in a vehicle (e.g., car, truck, tram, train, etc.) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in a variety of settings, including coordination between some functions or operations at individual endpoint devices or the edge gateway nodes 320, some others at the edge resource node 340, and others in the core data center 350 or global network cloud 360.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, the container is "spun down" (e.g., deactivated and/or deallocated) on the infrastructure in response to the execution being completed.

Further aspects of FaaS may enable deployment of edge functions in a service fashion, including a support of respective functions that support edge computing as a service. Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require deployment or configuration).

Example Internet of Things Architectures

Figure 4:
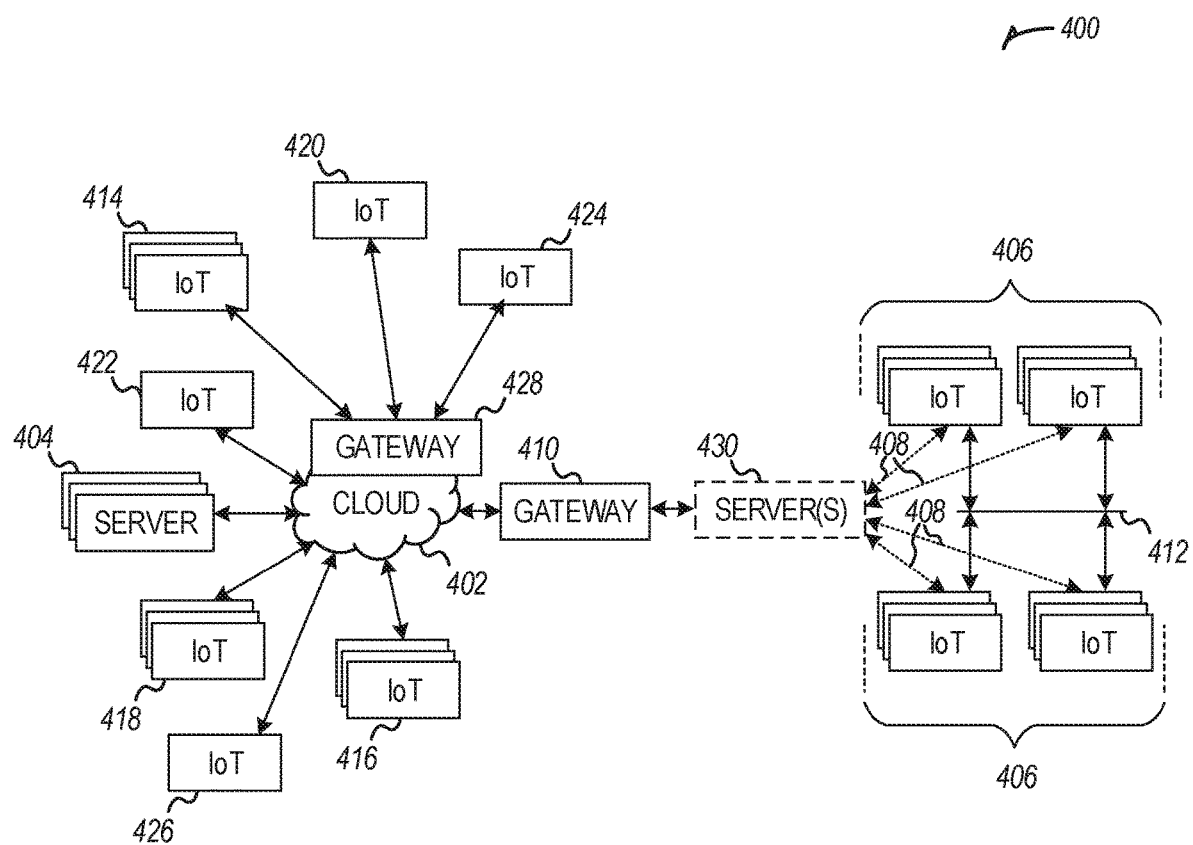
FIG. 4 illustrates a block diagram depicting deployment and communications among a number of Internet of Things (IoT) devices, according to an example.

As a more detailed illustration of an Internet of Things (IoT) network, FIG. 4 illustrates a drawing of a cloud or edge computing network, referred to as "cloud" 400, in communication with a number of IoT devices. The IoT is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Returning to FIG. 4, the cloud 400 may represent the Internet, or may be a local area network (LAN), or a wide area network (WAN), such as a proprietary network for a company. The IoT devices may include any number of different types of devices, grouped in various combinations. For example, a traffic control group 406 may include IoT devices along streets in a city. These IoT devices may include stoplights, traffic flow monitors, cameras, weather sensors, and the like. The traffic control group 406, or other subgroups, may be in communication with the cloud 400 through wired or wireless links 408, such as LPWA links, optical links, and the like. Further, a wired or wireless sub-network 412 may allow the IoT devices to communicate with each other, such as through a local area network, a wireless local area network, and the like. The IoT devices may use another device, such as a gateway 410 or 428 to communicate with remote locations such as the cloud 400; the IoT devices may also use one or more servers 430 to facilitate communication with the cloud 400 or with the gateway 410. For example, the one or more servers 430 may operate as an intermediate network node to support a local edge cloud or fog implementation among a local area network. Further, the gateway 428 that is depicted may operate in a cloud-to-gateway-to-many edge devices configuration, such as with the various IoT devices 414, 420, 424 being constrained or dynamic to an assignment and use of resources in the cloud 400.

Other example groups of IoT devices may include remote weather stations 414, local information terminals 416, alarm systems 418, automated teller machines 420, alarm panels 422, or moving vehicles, such as emergency vehicles 424 or other vehicles 426, among many others. Each of these IoT devices may be in communication with other IoT devices, with servers 404, with another IoT device or system, another edge computing or "fog" computing system, or a combination therein. The groups of IoT devices may be deployed in various residential, commercial, and industrial settings (including in both private or public environments).

As may be seen from FIG. 4, a large number of IoT devices may be communicating through the cloud 400. This may allow different IoT devices to request or provide information to other devices autonomously. For example, a group of IoT devices (e.g., the traffic control group 406) may request a current weather forecast from a group of remote weather stations 414, which may provide the forecast without human intervention. Further, an emergency vehicle 424 may be alerted by an automated teller machine 420 that a burglary is in progress. As the emergency vehicle 424 proceeds towards the automated teller machine 420, it may access the traffic control group 406 to request clearance to the location, for example, by lights turning red to block cross traffic at an intersection in sufficient time for the emergency vehicle 424 to have unimpeded access to the intersection.

Clusters of IoT devices may be equipped to communicate with other IoT devices as well as with a cloud network. This may allow the IoT devices to form an ad-hoc network between the devices, allowing them to function as a single device, which may be termed a fog device or system. Clusters of IoT devices, such as may be provided by the remote weather stations 414 or the traffic control group 406, may be equipped to communicate with other IoT devices as well as with the cloud 400. This may allow the IoT devices to form an ad-hoc network between the devices, allowing them to function as a single device, which also may be termed a fog device or system.

In further examples, a variety of topologies may be used for IoT networks comprising IoT devices, with the IoT networks coupled through backbone links to respective gateways. For example, a number of IoT devices may communicate with a gateway, and with each other through the gateway. The backbone links may include any number of wired or wireless technologies, including optical networks, and may be part of a local area network (LAN), a wide area network (WAN), or the Internet. Additionally, such communication links facilitate optical signal paths among both IoT devices and gateways, including the use of MUXing/de-MUXing components that facilitate interconnection of the various devices.

The network topology may include any number of types of IoT networks, such as a mesh network provided with the network using Bluetooth low energy (BLE) links. Other types of IoT networks that may be present include a wireless local area network (WLAN) network used to communicate with IoT devices through IEEE 802.11 (Wi-Fi®) links, a cellular network used to communicate with IoT devices through an LTE/LTE-A (4G) or 5G cellular network, and a low-power wide area (LPWA) network, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF).

Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources.

An IoT network, arranged as a mesh network, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

An IoT network, arranged as a WLAN network, for instance, may use systems that perform standards conversion to provide multi-standard connectivity, enabling IoT devices using different protocols to communicate. Further systems may provide seamless interconnectivity across a multi-standard infrastructure comprising visible Internet resources and hidden Internet resources.

An IoT network, using communications in the cellular network, for instance, may be enhanced by systems that offload data, extend communications to more remote devices, or both. A LPWA network may include systems that perform non-Internet protocol (IP) to IP interconnections, addressing, and routing. Further, each of the IoT devices may include the appropriate transceiver for wide area communications with that device. Further, each IoT device may include other transceivers for communications using additional protocols and frequencies.

In further examples, an edge or cloud computing network may be in communication with a mesh network of IoT devices at the edge of the cloud computing network. The mesh network of IoT devices may be termed a fog device or system, operating at the edge of the cloud. This fog device or system may be a massively interconnected network where a number of IoT devices are in communications with each other by radio links, for example. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Figure 8:
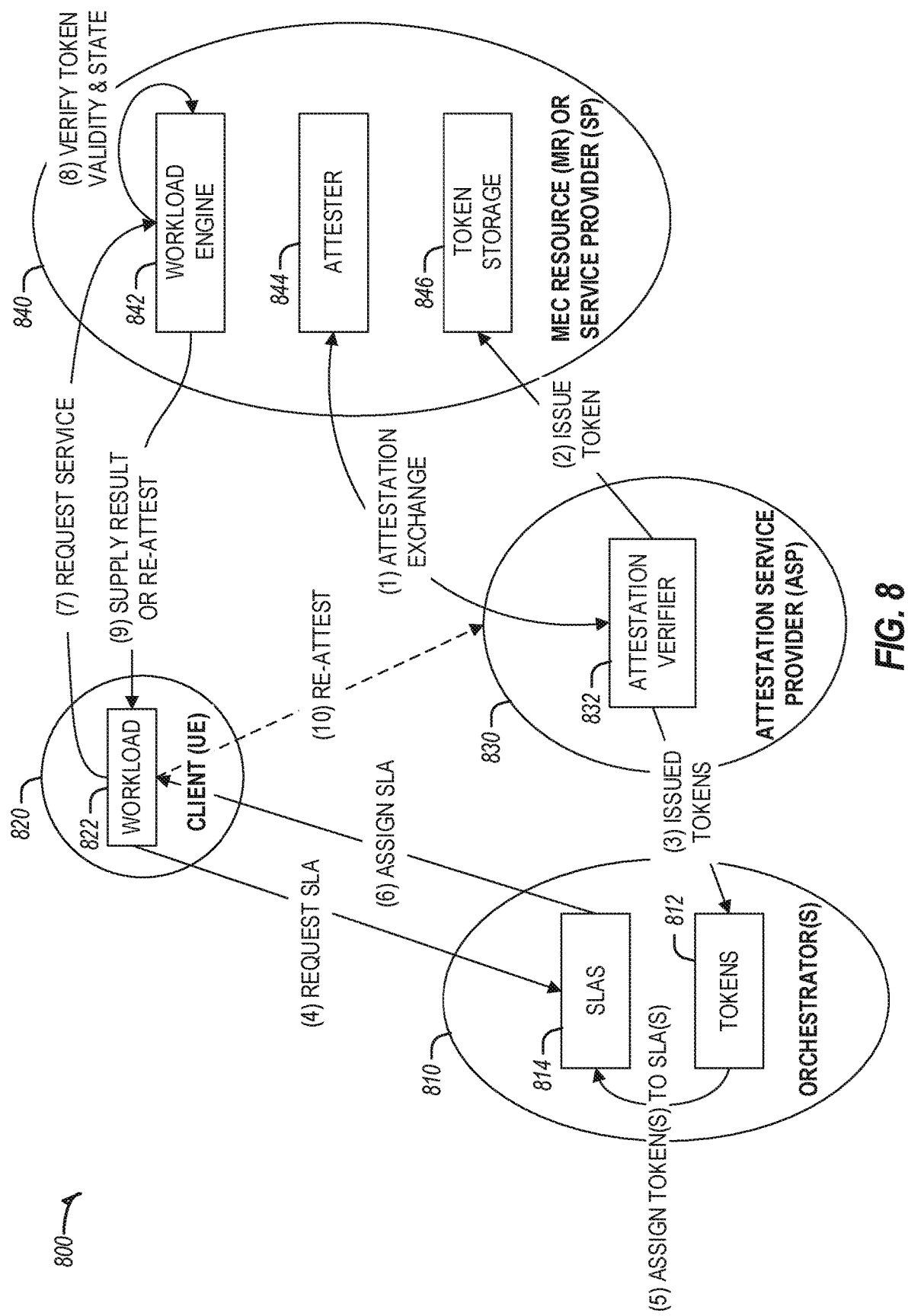
FIG. 8 illustrates a block diagram depicting usage of an attestation tokens and an attestation service provider for a MEC or edge computing resource, according to an example.
Figure 9:
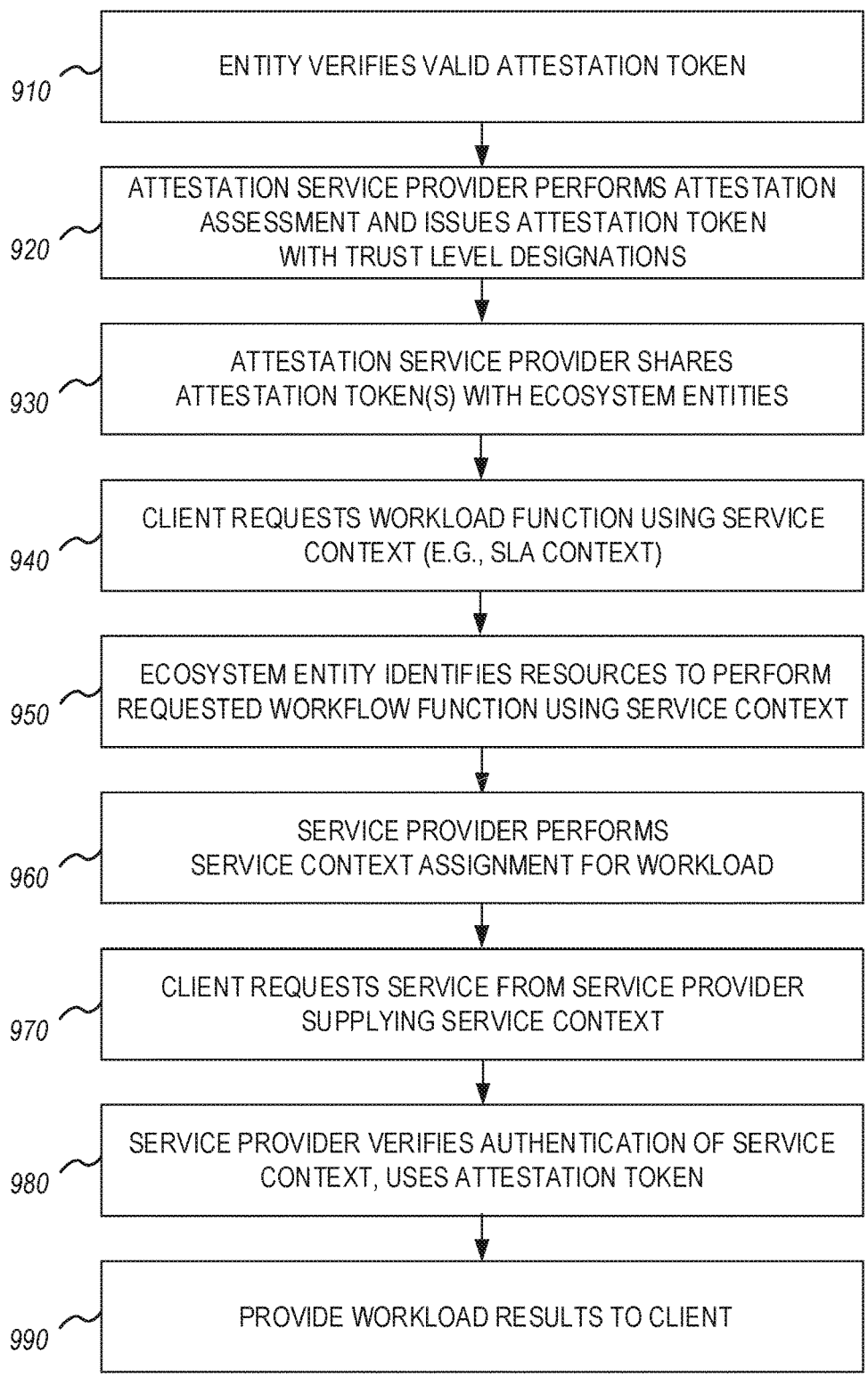
FIG. 9 illustrates a flowchart of an example process for attestation token sharing and usage, according to an example.

These and other examples of IoT networks may be enhanced with the following uses of attestation, such as with the architecture for attestation described in FIGS. 8 and 9. In this manner, an IoT device may be a client, which accesses an attested resource or service, based on the use of attestation tokens provided by an attestation service provider.

Example MEC Architectures

Some of the techniques and configurations discussed with reference to MEC may be (but are not required to be) relevant to the standards and approaches published in ETSI GS MEC-003 "Mobile Edge Computing (MEC); Framework and Reference Architecture" (e.g., V2.0.3) and related MEC or networked operational implementations. However, while the present attestation techniques and configurations may provide significant benefits to MEC architectures, the applicability of the present techniques and configurations may be extended to any number of edge computing, IoT, fog, or distributed computing platforms.

MEC is intended to support developing mobile use cases of edge computing, to allow application developers and content providers to access computing capabilities and an IT service environment in dynamic settings at the edge of the network. MEC offers application developers and content providers cloud-computing capabilities and an IT service environment using equipment located closer to network (e.g., cellular network) edges. This environment is characterized by ultra-low latency and high bandwidth as well as real-time access to radio network information that may be leveraged by applications. MEC technology permits operators to flexibly and rapidly deploy innovative applications and services towards mobile subscribers, enterprises and vertical segments.

MEC, like other edge computing deployments, may reduce network congestion by operating applications, data functions, and discovery, etc. closer to the user (e.g., mobile device, user equipment (UE), station (STA), etc.). Some MEC details dealing with security (e.g., both user security as well as application integrity), radio use, etc., have been promulgated by European Telecommunications Standards Institute (ETSI), such as described in the "Mobile Edge Computing Introductory Technical White Paper," published Sep. 1, 2014. A set of specifications and white papers providing further details and implementation use cases for MEC scenarios is being developed and published on an ongoing basis by ETSI as part of the ETSI MEC industry specification group (ISG).

MEC architectures offers application developers and content providers cloud-computing capabilities and an IT service environment at the edge of the network. This environment is characterized by ultra-low latency and high bandwidth as well as real-time access to radio network information that can be leveraged by applications. MEC technology thus permits flexible and rapid deployment of innovative applications and services towards mobile subscribers, enterprises and vertical segments. For instance, in automotive settings, applications such as V2X (vehicle-to-everything, IEEE 802.11p based or 3GPP LTE-V2X based) may use MEC technology to exchange data, provide data to aggregation points, and access data in databases to provide and obtain an overview of the local situation derived from a multitude of sensors (by various cars, roadside units, etc.).

Figure 5:
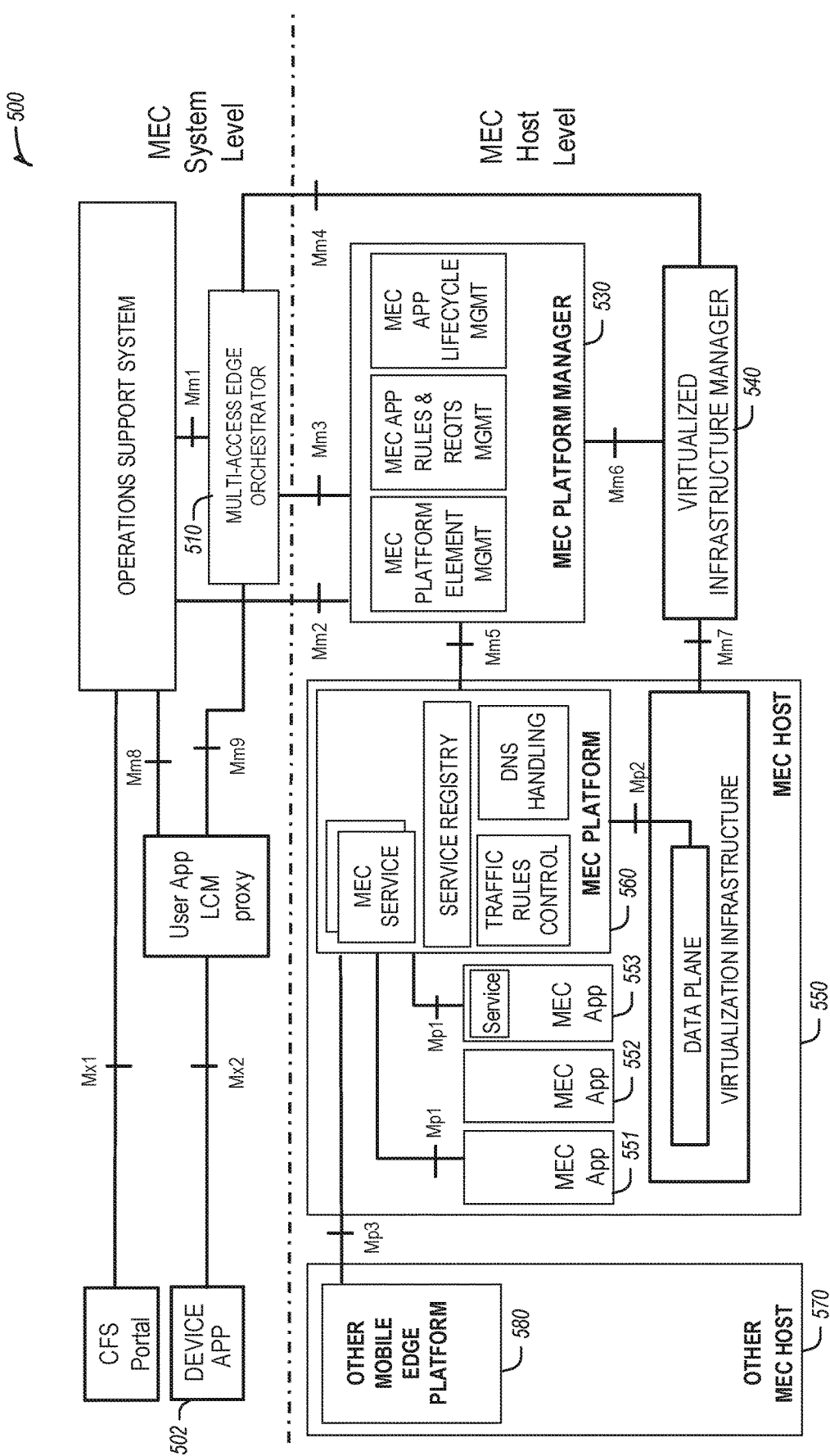
FIG. 5 illustrates a block diagram for a Multi-access Edge Computing (MEC) system architecture, according to an example.

FIG. 5 depicts a block diagram 500 for an example Multi-access Edge Computing (MEC) system architecture. In an example, the MEC system architecture may be defined according to a specification, standard, or other definition (e.g., according to the ETSI ISG MEC-003 specification). In this diagram, Mp reference points refer to MEC platform functionality; Mm reference points refer to management; and Mx refers to connections to external entities. The services, applications, orchestrators, and other entities discussed herein may be implemented at any number of the entities of the MEC system architecture depicted in FIG. 5, and the communications to perform network operations may be implemented at any number of the interfaces of the MEC system architecture depicted in FIG. 5.

For instance, a device application 502 operating at a client user equipment device (e.g., smartphone) may access a multi-access edge orchestrator 510, to obtain attestation information from an orchestrator as further detailed in FIGS. 8 and 9. A MEC Host 550 may operate one or more MEC applications 551, 552, 553 or a platform 560 which provide a MEC resource to be attested, as further detailed in FIGS. 8 and 9. A virtualized infrastructure manager 540 and MEC Platform Manager 530 provide management of the use of the hosts, platforms, and resources, and may also provide managed access to an attestation service or verifier (not shown). The virtualized infrastructure manager 540 and MEC Platform Manager 530 may also provide managed access to other MEC hosts (e.g., host 570) or MEC platforms (e.g., platform 580), which may also be involved with uses of attestation functionality as described herein.

Example Computing Devices

Figure 6:
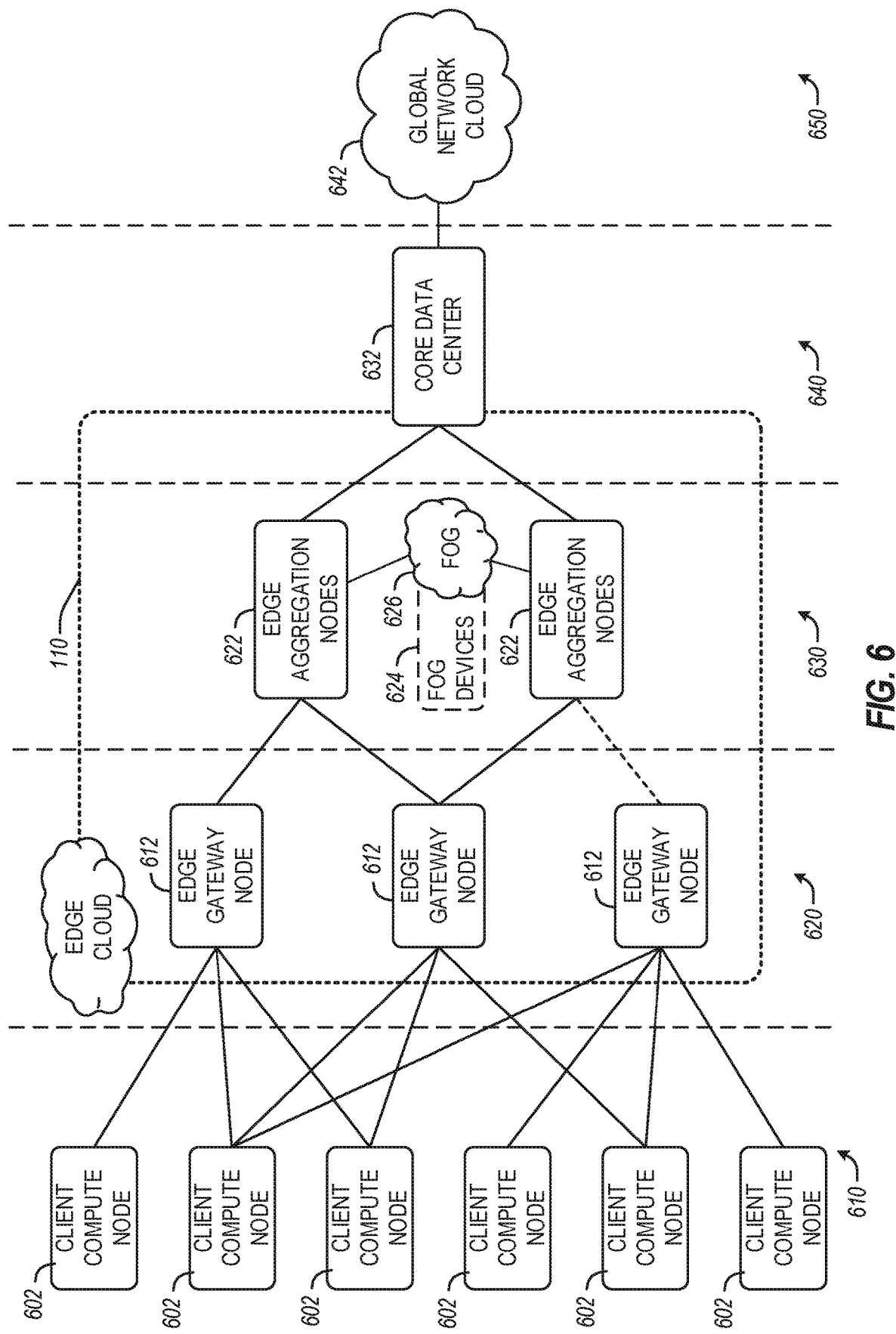
FIG. 6 illustrates an overview of layers of distributed compute deployed among an edge computing system, according to an example.

At a more generic level, an edge computing system may be described to encompass any number of deployments operating in the edge cloud 110, which provide coordination from client and distributed computing devices. FIG. 6 provides a further abstracted overview of layers of distributed compute deployed among an edge computing environment for purposes of illustration.

FIG. 6 generically depicts an edge computing system for providing edge services and applications to multi-stakeholder entities, as distributed among one or more client compute nodes 602, one or more edge gateway nodes 612, one or more edge aggregation nodes 622, one or more core data centers 632, and a global network cloud 642, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 610, 620, 630, 640, 650. For example, the client compute nodes 602 are each located at an endpoint layer 610, while each of the edge gateway nodes 612 are located at an edge devices layer 620 (local level) of the edge computing system. Additionally, each of the edge aggregation nodes 622 (and/or fog devices 624, if arranged or operated with or among a fog networking configuration 626) are located at a network access layer 630 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 632 is located at a core network layer 640 (e.g., a regional or geographically-central level), while the global network cloud 642 is located at a cloud data center layer 650 (e.g., a national or global layer). The use of "core" is provided as a term for a centralized network location-deeper in the network-which is accessible by multiple edge nodes or components; however, a "core" does not necessarily designate the "center" or the deepest location of the network. Accordingly, the core data center 632 may be located within, at, or near the edge cloud 110.

Although an illustrative number of client compute nodes 602, edge gateway nodes 612, edge aggregation nodes 622, core data centers 632, global network clouds 642 are shown in FIG. 6, it should be appreciated that the edge computing system may include more or fewer devices or systems at each layer. Additionally, as shown in FIG. 6, the number of components of each layer 610, 620, 630, 640, 650 generally increases at each lower level (i.e., when moving closer to endpoints). As such, one edge gateway node 612 may service multiple client compute nodes 602, and one edge aggregation node 622 may service multiple edge gateway nodes 612.

Consistent with the examples provided herein, each client compute node 602 may be embodied as any type of end point component, device, appliance, or "thing" capable of communicating as a producer or consumer of data. Further, the label "node" or "device" as used in the edge computing system 600 does not necessarily mean that such node or device operates in a client or slave role; rather, any of the nodes or devices in the edge computing system 600 refer to individual entities, nodes, or subsystems which include discrete or connected hardware or software configurations to facilitate or use the edge cloud 110.

As such, the edge cloud 110 is formed from network components and functional features operated by and within the edge gateway nodes 612 and the edge aggregation nodes 622 of layers 620, 630, respectively. The edge cloud 110 may be embodied as any type of network that provides edge computing and/or storage resources which are proximately located to radio access network (RAN) capable endpoint devices (e.g., mobile computing devices, IoT devices, smart devices, etc.), which are shown in FIG. 6 as the client compute nodes 602. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 626 (e.g., a network of fog devices 624, not shown in detail), which may be embodied as a system-level horizontal and distributed architecture that distributes resources and services to perform a specific function. For instance, a coordinated and distributed network of fog devices 624 may perform computing, storage, control, or networking aspects in the context of an IoT system arrangement. Other networked, aggregated, and distributed functions may exist in the edge cloud 110 between the core data center layer 650 and the client endpoints (e.g., client compute nodes 602). Some of these are discussed in the following sections in the context of network functions or service virtualization, including the use of virtual edges and virtual services which are orchestrated for multiple stakeholders.

The edge gateway nodes 612 and the edge aggregation nodes 622 cooperate to provide various edge services and security to the client compute nodes 602. Furthermore, because each client compute node 602 may be stationary or mobile, each edge gateway node 612 may cooperate with other edge gateway devices to propagate presently provided edge services and security as the corresponding client compute node 602 moves about a region. To do so, each of the edge gateway nodes 612 and/or edge aggregation nodes 622 may support multiple tenancy and multiple stakeholder configurations, in which services from (or hosted for) multiple service providers and multiple consumers may be supported and coordinated across a single or multiple compute devices.

In various examples, the present attestation techniques may be implemented among the client compute nodes 602 (e.g., at a client who receives an attestation token), at the edge gateway nodes 612 or aggregation nodes 622 (e.g., at a resource node which has a resource to be attested), and other intermediate nodes in the edge cloud 110 (e.g., which operate orchestrator functions, attestation service functions, etc.), as further discussed below with reference to FIGS. 8 and 9.

In further examples, any of the compute nodes or devices discussed with reference to the present edge computing systems and environment may be fulfilled based on the components depicted in FIGS. 7A and 7B. Each edge compute node may be embodied as a type of device, appliance, computer, or other "thing" capable of communicating with other edge, networking, or endpoint components. For example, an edge compute device may be embodied as a smartphone, a mobile compute device, a smart appliance, an in-vehicle compute system (e.g., a navigation system), or other device or system capable of performing the described functions.

Figure 7A:
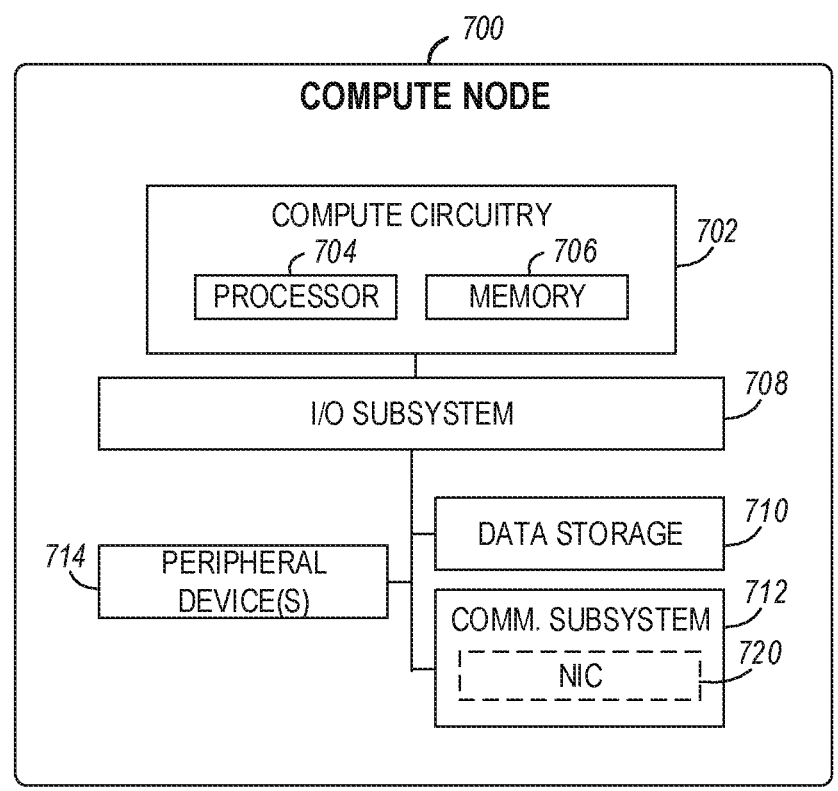
FIG. 7A illustrates an overview of example components deployed at a compute node system, according to an example.

In the simplified example depicted in FIG. 7A, an edge compute node 700 includes a compute engine (also referred to herein as "compute circuitry") 702, an input/output (I/O) subsystem 708, data storage 710, a communication circuitry subsystem 712, and, optionally, one or more peripheral devices 714. In other examples, each compute device may include other or additional components, such as those used in personal or server computing systems (e.g., a display, peripheral devices, etc.). Additionally, in some examples, one or more of the illustrative components may be incorporated in, or otherwise form a portion of, another component.

The compute node 700 may be embodied as any type of engine, device, or collection of devices capable of performing various compute functions. In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing an application). For example, the processor 704 may be embodied as a multi-core processor(s), a microcontroller, or other processor or processing/controlling circuit. In some examples, the processor 704 may be embodied as, include, or be coupled to an FPGA, an application specific integrated circuit (ASIC), reconfigurable hardware or hardware circuitry, or other specialized hardware to facilitate performance of the functions described herein.

The main memory 706 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In one example, the memory device is a block addressable memory device, such as those based on NAND or NOR technologies. A memory device may also include a three-dimensional crosspoint memory device (e.g., Intel 3D XPoint™ memory), or other byte addressable write-in-place nonvolatile memory devices. The memory device may refer to the die itself and/or to a packaged memory product. In some examples, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the main memory 706 may be integrated into the processor 704. The main memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the main memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Each data storage device 710 may include a system partition that stores data and firmware code for the data storage device 710. Each data storage device 710 may also include one or more operating system partitions that store data files and executables for operating systems depending on, for example, the type of compute node 700.

The communication circuitry 712 may be embodied as any communication circuit, device, or collection thereof, capable of enabling communications over a network between the compute circuitry 702 and another compute device (e.g., an edge gateway node 612 of the edge computing system 600). The communication circuitry 712 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, etc.) to effect such communication.

The illustrative communication circuitry 712 includes a network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another compute device (e.g., an edge gateway node 612). In some examples, the NIC 720 may be embodied as part of a system-on-a-chip (SoC) that includes one or more processors, or included on a multichip package that also contains one or more processors. In some examples, the NIC 720 may include a local processor (not shown) and/or a local memory (not shown) that are both local to the NIC 720. In such examples, the local processor of the NIC 720 may be capable of performing one or more of the functions of the compute circuitry 702 described herein. Additionally or alternatively, in such examples, the local memory of the NIC 720 may be integrated into one or more components of the client compute node at the board level, socket level, chip level, and/or other levels.

Additionally, in some examples, each compute node 700 may include one or more peripheral devices 714. Such peripheral devices 714 may include any type of peripheral device found in a compute device or server such as audio input devices, a display, other input/output devices, interface devices, and/or other peripheral devices, depending on the particular type of the compute node 700. In further examples, the compute node 700 may be embodied by a respective edge compute node in an edge computing system (e.g., client compute node 602, edge gateway node 612, edge aggregation node 622) or like forms of appliances, computers, subsystems, circuitry, or other components.

Figure 7B:
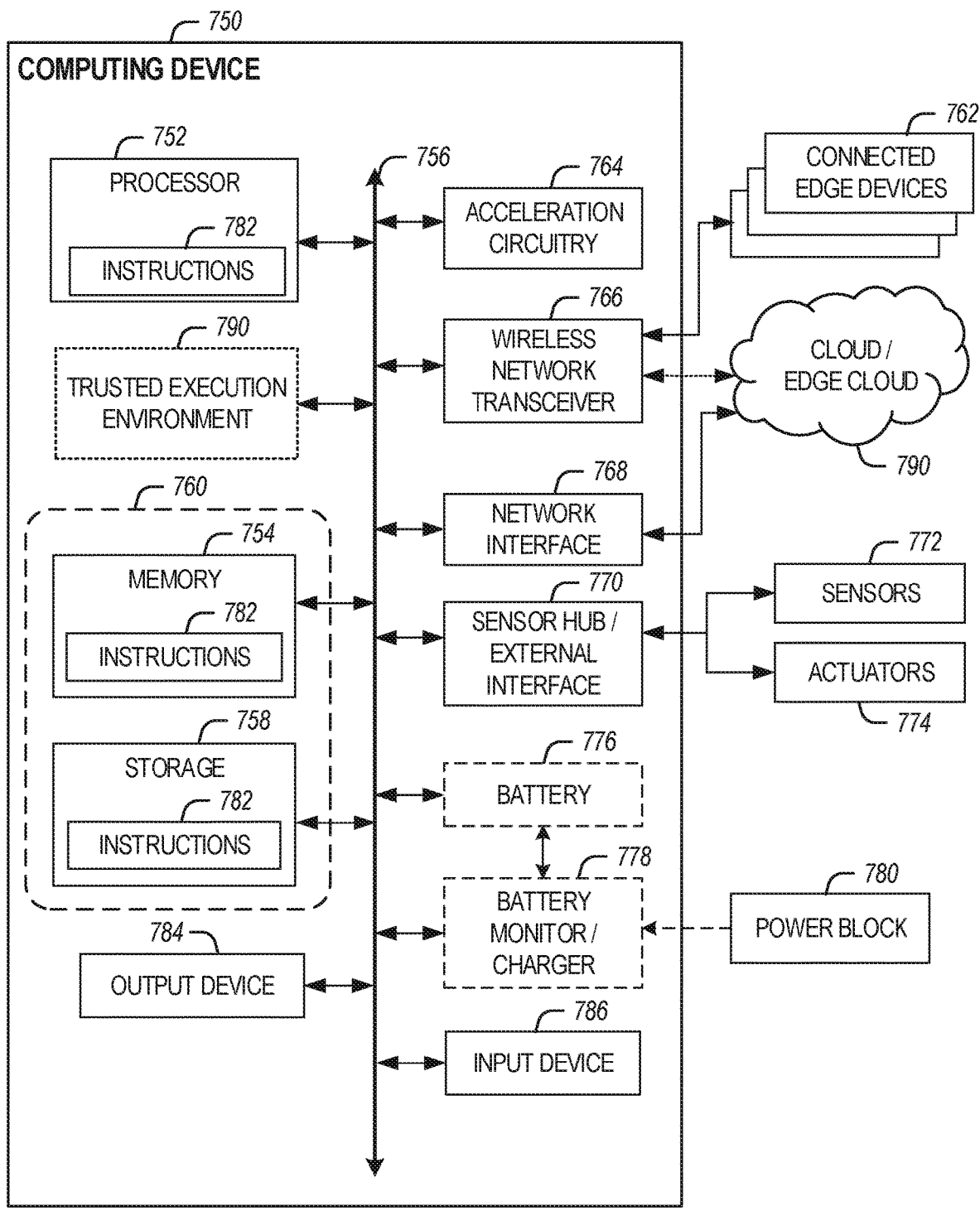
FIG. 7B illustrates a further overview of example components within a computing device, according to an example.

In a more detailed example, FIG. 7B illustrates a block diagram of an example of components that may be present in an edge computing node 750 for implementing the techniques (e.g., operations, processes, methods, and methodologies) described herein. The edge computing node 750 may include any combinations of the components referenced above, and it may include any device usable with an edge communication network or a combination of such networks. The components may be implemented as ICs, portions thereof, discrete electronic devices, or other modules, logic, hardware, software, firmware, or a combination thereof adapted in the edge computing node 750, or as components otherwise incorporated within a chassis of a larger system.

The edge computing node 750 may include processing circuitry in the form of a processor 752, which may be a microprocessor, a multi-core processor, a multithreaded processor, an ultra-low voltage processor, an embedded processor, or other known processing elements. The processor 752 may be a part of a system on a chip (SoC) in which the processor 752 and other components are formed into a single integrated circuit, or a single package, such as the Edison™ or Galileo™ SoC boards from Intel Corporation, Santa Clara, Calif. As an example, the processor 752 may include an Intel® Architecture Core™ based processor, such as a Quark™, an Atom™, an i3, an i5, an i7, an i9, or an MCU-class processor, or another such processor available from Intel®. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or a customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 752 may communicate with a system memory 754 over an interconnect 756 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 758 may also couple to the processor 752 via the interconnect 756. In an example, the storage 758 may be implemented via a solid-state disk drive (SSDD). Other devices that may be used for the storage 758 include flash memory cards, such as SD cards, microSD cards, XD picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 758 may be on-die memory or registers associated with the processor 752. However, in some examples, the storage 758 may be implemented using a micro hard disk drive (HDD). Further, any number of new technologies may be used for the storage 758 in addition to, or instead of, the technologies described, such resistance change memories, phase change memories, holographic memories, or chemical memories, among others.

The components may communicate over the interconnect 756. The interconnect 756 may include any number of technologies, including industry standard architecture (ISA), extended ISA (EISA), peripheral component interconnect (PCI), peripheral component interconnect extended (PCIx), PCI express (PCIe), or any number of other technologies. The interconnect 756 may be a proprietary bus, for example, used in an SoC based system. Other bus systems may be included, such as an I2C interface, an SPI interface, point to point interfaces, and a power bus, among others.

The interconnect 756 may couple the processor 752 to a transceiver 766, for communications with the connected edge devices 762. The transceiver 766 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 762. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 766 (or multiple transceivers) may communicate using multiple standards or radios for communications at a different range. For example, the edge computing node 750 may communicate with close devices, e.g., within about 10 meters, using a local transceiver based on BLE, or another low power radio, to save power. More distant connected edge devices 762, e.g., within about 50 meters, may be reached over ZigBee or other intermediate power radios. Both communications techniques may take place over a single radio at different power levels or may take place over separate transceivers, for example, a local transceiver using BLE and a separate mesh transceiver using ZigBee.

A wireless network transceiver 766 (e.g., a radio transceiver) may be included to communicate with devices or services in the edge cloud 790 via local or wide area network protocols. The wireless network transceiver 766 may be an LPWA transceiver that follows the IEEE 802.15.4, or IEEE 802.15.4g standards, among others. The edge computing node 750 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 766, as described herein. For example, the transceiver 766 may include a cellular transceiver that uses spread spectrum (SPA/SAS) communications for implementing high-speed communications. Further, any number of other protocols may be used, such as Wi-Fi® networks for medium speed communications and provision of network communications. The transceiver 766 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 768 may be included to provide a wired communication to nodes of the edge cloud 790 or to other devices, such as the connected edge devices 762 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 768 may be included to enable connecting to a second network, for example, a first NIC 768 providing communications to the cloud over Ethernet, and a second NIC 768 providing communications to other devices over another type of network.

Given the variety of types of applicable communications from the device to another component or network, applicable communications circuitry used by the device may include or be embodied by any one or more of components 764, 766, 768, or 770. Accordingly, in various examples, applicable means for communicating (e.g., receiving, transmitting, etc.) may be embodied by such communications circuitry.

The edge computing node 750 may include or be coupled to acceleration circuitry 764, which may be embodied by one or more AI accelerators, a neural compute stick, neuromorphic hardware, an FPGA, an arrangement of GPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. Accordingly, in various examples, applicable means for acceleration may be embodied by such acceleration circuitry.

The interconnect 756 may couple the processor 752 to a sensor hub or external interface 770 that is used to connect additional devices or subsystems. The devices may include sensors 772, such as accelerometers, level sensors, flow sensors, optical light sensors, camera sensors, temperature sensors, a global positioning system (GPS) sensors, pressure sensors, barometric pressure sensors, and the like. The hub or interface 770 further may be used to connect the edge computing node 750 to actuators 774, such as power switches, valve actuators, an audible sound generator, a visual warning device, and the like.

In some optional examples, various input/output (I/O) devices may be present within or connected to, the edge computing node 750. For example, a display or other output device 784 may be included to show information, such as sensor readings or actuator position. An input device 786, such as a touch screen or keypad may be included to accept input. An output device 784 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the edge computing node 750.

A battery 776 may power the edge computing node 750, although, in examples in which the edge computing node 750 is mounted in a fixed location, it may have a power supply coupled to an electrical grid. The battery 776 may be a lithium ion battery, or a metal-air battery, such as a zinc-air battery, an aluminum-air battery, a lithium-air battery, and the like.

A battery monitor/charger 778 may be included in the edge computing node 750 to track the state of charge (SoCh) of the battery 776. The battery monitor/charger 778 may be used to monitor other parameters of the battery 776 to provide failure predictions, such as the state of health (SoH) and the state of function (SoF) of the battery 776. The battery monitor/charger 778 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 778 may communicate the information on the battery 776 to the processor 752 over the interconnect 756. The battery monitor/charger 778 may also include an analog-to-digital (ADC) converter that enables the processor 752 to directly monitor the voltage of the battery 776 or the current flow from the battery 776. The battery parameters may be used to determine actions that the edge computing node 750 may perform, such as transmission frequency, mesh network operation, sensing frequency, and the like.

A power block 780, or other power supply coupled to a grid, may be coupled with the battery monitor/charger 778 to charge the battery 776. In some examples, the power block 780 may be replaced with a wireless power receiver to obtain the power wirelessly, for example, through a loop antenna in the edge computing node 750. A wireless battery charging circuit, such as an LTC4020 chip from Linear Technologies of Milpitas, Calif., among others, may be included in the battery monitor/charger 778. The specific charging circuits may be selected based on the size of the battery 776, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 758 may include instructions 782 in the form of software, firmware, or hardware commands to implement the techniques described herein. Although such instructions 782 are shown as code blocks included in the memory 754 and the storage 758, it may be understood that any of the code blocks may be replaced with hardwired circuits, for example, built into an application specific integrated circuit (ASIC).

In an example, the instructions 782 provided via the memory 754, the storage 758, or the processor 752 may be embodied as a non-transitory, machine-readable medium 760 including code to direct the processor 752 to perform electronic operations in the edge computing node 750. The processor 752 may access the non-transitory, machine-readable medium 760 over the interconnect 756. For instance, the non-transitory, machine-readable medium 760 may be embodied by devices described for the storage 758 or may include specific storage units such as optical disks, flash drives, or any number of other hardware devices. The non-transitory, machine-readable medium 760 may include instructions to direct the processor 752 to perform a specific sequence or flow of actions, for example, as described with respect to the flowchart(s) and block diagram(s) of operations and functionality depicted above. As used in, the terms "machine-readable medium" and "computer-readable medium" are interchangeable.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Each of the block diagrams of FIGS. 7A and 7B are intended to depict a high-level view of components of a device, subsystem, or arrangement of an edge computing node. However, it will be understood that some of the components shown may be omitted, additional components may be present, and a different arrangement of the components shown may occur in other implementations.

Attestation Examples

In a conventional attestation model, there is an attester and a verifier. In this scenario, the attester seeks access to relying party resources or seeks to control relying party behavior, and asks the verifier to provide proof. This arrangement works when the attester is the resource requester and the verifier is the resource owner. However, in distributed computing settings, especially in edge computing settings that are reliant on orchestration to connect servers to clients, other entities (such as the orchestrator) are in a better position to connect to different resources and coordinate attestation activities.

In the context of a deployed system (such as the IoT system depicted in FIG. 4, the MEC system depicted in FIG. 5, the edge computing system depicted in FIG. 6, or like variations of distributed computing architectures) the present techniques and configurations provide the capability for communicating, managing, and verifying an attestation of a device, service, resource, or other applicable entity (further referred to as a "feature"). As will be well understood, attestation refers to the state, condition, or method in which one entity authenticates some property to another entity, such as a client authenticating its hardware and software configuration or state to a server.

Attestation often precedes security relevant operations such as adding a system to a network (e.g., onboarding), issuance of a local identity (e.g., LDevID), use of an authentication credential, or exchange of application data. However, attestation can be a multi-step exchange of information that some authentication, authorization, or data exchange protocols can support without modification. Thus, interoperability can be impacted as a result of inconsistent or incomplete attestation activities. Additionally, attestation might not need to be performed before each security relevant action but may be requested or needed dynamically based on changing operational risk levels.

In contrast to the attestation techniques described herein, conventional approaches for attestation are traditionally binary in nature and do not allow for a partial attestation that results in conditional access (less access time, full packet capture of activities, real time monitoring of all activities, etc.). Existing approaches also do not allow attestation information to be carried by a client (e.g., a UE or MEC Application) or by an SLA/SLO structure as a pre-requisite to gaining access to a service or resource. In contrast, the techniques described herein introduce an approach where upon receipt of an attestation token, the service or resource in question can quickly verify the token represents the current operating state of the service or resource, and if the state has changed, the client and/or orchestration entities can be notified of such unanticipated state change.

Conventional approaches for attestation and verification also do not propose a scalable communication scheme that can be added/updated in a highly distributed environment (e.g., 5G, Edge environments) by multiple parties. With the present techniques, the issuance of a new attestation token for the same entity (and its one or more identities) may be used to revoke the previous token(s).

Also, conventional approaches lack the capability to derive common SLAs across an end-to-end compute scenario (e.g., across combinations of UE, Smart Near Edge, Smart Far Edge, Cloud systems) that scales well for FaaS-based services. Finally, conventional approaches lack the capability to tie a variety of SLAs that differ in terms of security and resource management with orchestration, thereby resulting in poor resource utilization and increased total cost of ownership.

These and other disadvantages of conventional or existing approaches are addressed by the following techniques and configurations for attestation. In an example, orchestrators may request an attestation token from services or resources participating in an orchestrated interaction. This orchestrated interaction may be supported by an SLA involving a UE (customer), such as a UE that agrees to pay for orchestrated services involving multiple resources promising a minimum level of trust (e.g., a promise to protect UE workload contents and data) during execution of the SLA promise that applies to data in flight and data at rest. Cryptography of I/O may also be treated as an attested resource.

The orchestrators, in this setting, need not incur the cost of a full attestation check each time a token is presented, but rather the orchestrators may rely on the token expiration to be satisfied that the service or resource remains in compliance with domain defined trust policy. In some examples, however, the orchestrator or other entities can read and check the attestation token from a public blockchain (such as an identity attestation blockchain).

The attestation token discussed herein may be of sufficient complexity to include variations in trust policies such that a minimum level trust policy, one or more moderate trust levels, or a maximal trust level is expressed. Other types of content or trust values may be associated with the token. Orchestrators may use trust policy levels as a way to partition SLAs according to expected security hardening of services and resources provided during the execution of the SLA. Trust policy levels may also serve as a mechanism to set different rates of billing or subscription to compensate for added cost associated with increased trust. Tokens may be chained, embedded, proxied, delegated and proactively replenished for efficient, yet flexible, orchestration.

In an example, attestation token and service delivery data may be correlated with the prescribed and contracted SLAs in place to ascertain whether services were delivered on the required security level of the platforms as required by the SLA. Further, MEC platforms and resources may contain a private key and attestation profile that may be used to satisfy attestation requirements driven by a particular SLA. The profile ensures resource utilization occurs with the appropriate application, timeframe, allocation level and with SLA certification.

In an example, capabilities are provided to dynamically query security attributes in an end-to-end (E2E) compute partition of participating compute entities (e.g., UE, Smart Near Edge, Smart Far Edge, Cloud, etc.) to identify common SLA security attributes to enable efficient compute across the tiers (e.g., to use a lowest common denominator). Respective trusted execution environments (TEEs) in the participating compute elements can also guarantee the security attributes and the enforcement of the associated SLAs.

In an example, Hierarchical Token Management (HTM) is provided with the present attestation techniques, where a particular SLA is associated with a hierarchy of service providers (e.g., an edge server depends on other servers to process a distributed workload that anticipates service migration). HTM enables efficient resource management and efficient book-keeping when soft resources are migrated dynamically to maintain SLAs. This record keeping may help in efficient auditing to meet regulatory requirements and in tracking provenance.

In an example, attestation token techniques provide the ability to have a granular attestation scheme that does not result in a service interruption in the event of partial attestation using a smaller percentage of claims. This may also result in an additional compensating control with higher visibility to the actions that are being performed with the corresponding token.

As will be understood, many forms of platforms and devices may have their own Identities/Pub-Keys (e.g., OCP Cerberus, PCIe, USB-C, etc.) hence the attestation scope will be much larger, creating the need for improved scalability of attestation in edge computing scenarios. This can be addressed with the present use of attestation tokens, and the use of attestation tokens in concert with blockchains or other tracking protocols.

FIG. 8 includes a block diagram for an example MEC system 800 enhanced with attestation improvements through the use of the presently described attestation tokens and the operation of an Attestation Service Provider (ASP) 830. It will be understood that for purposes of simplicity, a number of network entities and devices are not shown.

MEC workflows often involve the tenant workload origination node (a client 820), as well as an orchestration node 810, having to maintain attestation context and state across multiple service provider nodes. In an example, the deployment of a security controller (such as a security controller indicated in the ETSI NFV SEC013 specification) may be extended to offer the Attestation Service and perform attestation token issuance. Upon deployment, the security controller can then deliver these attestation tokens to one or more orchestrators 810 (such as an application orchestrator, network service orchestrator, etc.) involved in delivering the respective MEC Services on the platform to the client 820.

In the MEC system 800 environment depicted in FIG. 8, attestation token delivery may be performed via authenticated links between entities, or over a blockchain framework. Attestation state can be represented as a token data structure (e.g., a JSON Web Token (JWT), defined by IETF RFC 7519 et al, or CBOR Web Token (CWT), as defined by draft IETF specifications) where one or more security claims about execution environment integrity and trust may exist inside the token.

In a distributed computing environment involving many actors, such as within a MEC system environment, a challenge exists in getting the attestation token distributed to all the other nodes involved in the workflow/workload processing. In an example, one solution is to use a single-sign-on (SSO) server such as OAuth2, SAML or Kerberos to distribute the attestation token. For example, SSO may be used such that the object contained in the SSO payload is an attestation token (rather than an authentication key or authentication token).

It may be appropriate to also require authentication tokens and keys as part of a system solution where the authentication token/key reference is included as a claim in the attestation token. The verifier(s) then will verify not only the trust claims as being suitable for hosting a particular workload, but also will verify the authentication key/token is protected by a suitable, verified execution environment. Verifiers (such as an attestation service provider 830, discussed in more detail below) can also play the role of "Miners/Verifiers" prior to adding attestation tokens to a blockchain. Tokens contributed to a blockchain are a permanent record of attestation status which can be accessed for Security Posture, SLA reference, billing, regulatory and other purposes.

Edge/MEC ecosystems cannot assume that workloads provided by a central trusted organization (e.g., a telecommunications service provider) have executed in a trusted environment, such as in hardware-based security TEEs (e.g., provided by vendors such as Intel® Software Guard Extensions (SGX), Intel® Trusted Domain Extensions (TDX), AMD® Secure Encrypted Virtualization with Encrypted State (SEV-ES), etc.). Rather, each stakeholder and stakeholder environment should be verified (dynamically), with use of the present attestation token, as part of workload/ workflow scheduling in order to allow a more flexible execution infrastructure. This allows for democratization of the Edge/MEC infrastructure that allows smaller service providers to participate.

In a further example, the attestation service provider (ASP) 830 need not be a single entity. There may be multiple ASPs each within the same or multiple administrative domains (such as enterprises who will run services on MEC hosts; a Network Service Provider who will run network services; Operator/Infrastructure owners that run the MEC infrastructure, etc.). MEC systems using attestation tokens may be highly distributed, and some may reference back to central data servers, while others may use distributed (replicated) storage servers. Various forms of connectivity and replication may be used to optimize network connectivity, latency, caching and availability tradeoffs.

FIG. 9 depicts a flowchart 900 of an example process for attestation token sharing and usage. The following process is described from the perspective of a multiple entities in the MEC distributed computing environment 800, depicted in FIG. 8. However, the following operations may be performed or coordinated by other entities or systems.

Operation 910: The initial entity (e.g., a MEC resource or service provider (SP) 840) verifies a valid attestation token. In an example, each time the MEC resource or SP comes online, this entity uses an attester 844 to verify it has a valid (un-expired) attestation token. If expired, the entity requests attestation from an attestation verifier 832 of an Attestation Service Provider (ASP) 830. In an example, the ETSI NFV SEC013 Security Controller can be extended to support this Attestation Service, and distribute to one or more other Orchestrators 810.

Step 920: Attestation assessment is performed, by the ASP 830, to issue an attestation token with trust level designations. In an example, attestation assessment is performed and the attestation token (AT) is issued that may contain one or more 'trust level' designations. Trust levels are an abstraction where a set of attested attributes are assigned to a first level, and a second set of attributes are assigned to a second level, and so forth. The token may be signed by the ASP 830 to ensure its authenticity. This is optional if, in the following step, the token is also included in the SLA as an ASP-signed token. The token may be stored in token storage 846 at the MEC resource or SP 840. Additionally, the signed tokens may be contributed to a blockchain or central directory service where relying parties may independently audit or otherwise verify the attestation status of the MEC resource or SP entities.

Step 930: The ASP 830 shares attestation token(s) with ecosystem entities. In an example, issued tokens may be shared with other members of a MEC ecosystem including orchestrators 810. Orchestrators 810 may store issued tokens 812 for use with workload scheduling and SLA creation and provides resilience in the case of networking failures upstream to attestation service. In one embodiment, this Attestation Token is broadly available to all parties.

Step 940: A client 820 requests a workload 822 function. In an example, the MEC client/UE may request a workload function to be performed using a service context (e.g., an SLA).

Step 950: An ecosystem entity (e.g., orchestrator 810) identifies resources to perform the requested workflow function using a service context (e.g., using SLAs 814). In an example, the orchestrator 810 identifies which of the MEC resources 840 are needed to perform the requested workload 822 at the appropriate level of trust. Issued tokens 812 that meet these criteria may be assigned to the SLA(s) 814 for a given client workload.

Step 960: A service provider performs a service context assignment for a workload. In an example, after the SLA assignment for the given workload 822 is established, and the assignment may be signed by the orchestrator 810 to prove authenticity of the assignment.

Step 970: A client 820 requests the service from a service provider supplying service context. In an example, the client 820 requests services or resources (e.g., at a workload engine 842) from a MEC resource or SP 840 supplying the SLA.

Step 980: The service provider verifies authentication of service context, through use of the attestation token. In an example, the service provider workload engine/processor 842 verifies authenticity of the SLA 814 and reads the AT list to find a token that was previously issued by the ASP 830. If the token is found, the SP 840 knows the orchestrator 810 intended the client 820 to use this service provider in the context of the trust level or policy as contained in the Token. The workload engine 842 may require the workload to execute in a more secure environment such as a container, virtual machine, SGX enclave, TDX domain, DICE layering architecture, hardware security module (HSM), embedded secure element (eSE), trusted platform module (TPM), or other security processor and may require dedicated secured interfaces to the environment such as MACSEC/IPSEC/ TLS/SPDM/MCTP where these protocols may be augmented to support attestation data exchange.

Step 990: The workload results are provided or otherwise made available to the client, such as from the workload engine 842 to client 820. Note: in some workflow scenarios, the results may be forwarded to a workflow processing host that further processes the workload or may return to the orchestrator for follow-up orchestration; likewise, other forms of redirection, load balancing, or proxying may occur.

In a further step (not shown), if the attestation token verification fails (e.g., the token has expired or the current environment differs from the expected environment) then a re-attestation may be required. The ASP 830 is notified regarding the failure and the previous token is invalidated (if not expired); the resource or service provider 840 may be contacted for re-attestation or the resource or service provider 840 may proactively seek re-attestation upon detection of an invalid token.

In this re-attestation use case, a re-attestation may involve incremental or additive attestations where a sub-component resource required to more effectively achieve an SLA might be attested and a new token issued that references the added component. For example, consider a scenario where a bitstream for a Function_A exists for an FPGA resource in Node_A but Function_A was omitted from a first attestation token issuance. an attestation token re-issuance may append Function_A to a list of trustworthy components named in an attestation token.

If there is a compromise in the attestation authority or any other chain of trust, a mechanism to revoke all tokens can be part of the token data model. This would be an alternate to an instant expiration of all valid tokens as a protection against a high-risk compromise. This also allows federation between two domains thereby allowing to trust each other's tokens according to their pre-negotiated policies between these domains. This would allow one-time configuration of policy across domains and then sharing of attestation tokens across them.

Other variations to the preceding procedures and interfaces will be apparent from the examples above. For instance, the present techniques may be extended to attestation of the combined, chained hashes of images to an attestation authority or blockchain-based signature identity infrastructure.

The above-described MEC service authentication techniques, using attestation tokens, may be augmented for use in end-to-end computing paradigms. Such usage may enable orchestrators to track the security attributes of participating entities (e.g., UE, Smart Near Edge, Smart Far Edge, Cloud, etc.) for FaaS scenarios, and determine the appropriate SLA based on the compute agent capabilities for a given transaction. In an example, the orchestrator can maintain a hierarchical token relationship across live transactions across one to many UEs dynamically for efficient token and resource partitioning. Further, token scalability and flexibility, particularly for orchestrators managing highly dynamic chains of microservices, may be enhanced by the following extensions of tokens:

Configuration of Referenced Tokens: The attestation tokens for a first MEC resource R and assigned to SLAs may include, by reference, tokens for a second resource R' that the first MEC resource R describes to the ASP during the attestation exchange. The additional resources R' may be proxied by R, or may be independently attested with the ASP, but which are invoked from the workload engine. This permits token chains to be incorporated into the above SSO framework. As will be understood, token chaining facilitates MEC system scalability. Token chaining may also facilitate distributed workflow execution as the chain sequencing may be used to describe acceptable sequences of access. For example, a FaaS workload that intends for function_A( ) on Node_A to precede function_B( ). Node_B may incorporate a token for Node_A that is a chained token for Node_B.

Disaggregation of Tokens: Tokens delivered by the orchestrator may refer not only to the MEC resources individually attested with the ASP, but also to any disaggregated resources that are part of a system dynamically composed by the orchestrator. In effect, the tokens are compound tokens that represent the individual SLAs at each of the disaggregated resources included in an aggregation. For example, if function_A( ) is described as a composite resource of Node_A, then the attestation token for Node_A may list function_A( ) as a known trustworthy component of Node_A. An attestation protocol that is the aggregate of multiple nodes A and B may be issued an Aggregate Attestation Token that establishes trust for multiple nodes A and B.

Burst Control for Tokens: Re-attestation may be performed between a client/UE and the ASP. Re-attestation may also be optionally performed on a recurring basis between a MEC resource and an ASP for tokens designed to be short-lived and used for flow control, such as in traffic shaping, to reduce intensity of burst arrivals which may be exacerbated by dynamic change to hosting environments to support differing workloads that necessarily changes the trust dynamic established by a prior attestation. In such cases, when the workloads are made available, the engines automatically invalidate their previous attestation because a more recent start time to a validity period in a re-issued attestation token is observed. In this way, tokens are used up within a finite time and are regenerated; and client request rates are upper bounded by reducing the possibility of arbitrary delays for SLA assignment.

Proactive Re-Attestation initiated by Orchestrators using Tokens: An orchestrator may implement a forward-looking algorithm by which it tracks tokens approaching expirations, and informs either the ASP or the MEC resource, and thereby triggering a re-attestation proactively. Orchestrators must balance the cost of redoing attestation checks against the potential for malicious or accidental change to the service provider that might invalidate the trust semantic embedded in the attestation token. Workload processing may halt or be delayed during an attestation as performing attestation also incurs computational overhead.

Figure 10:
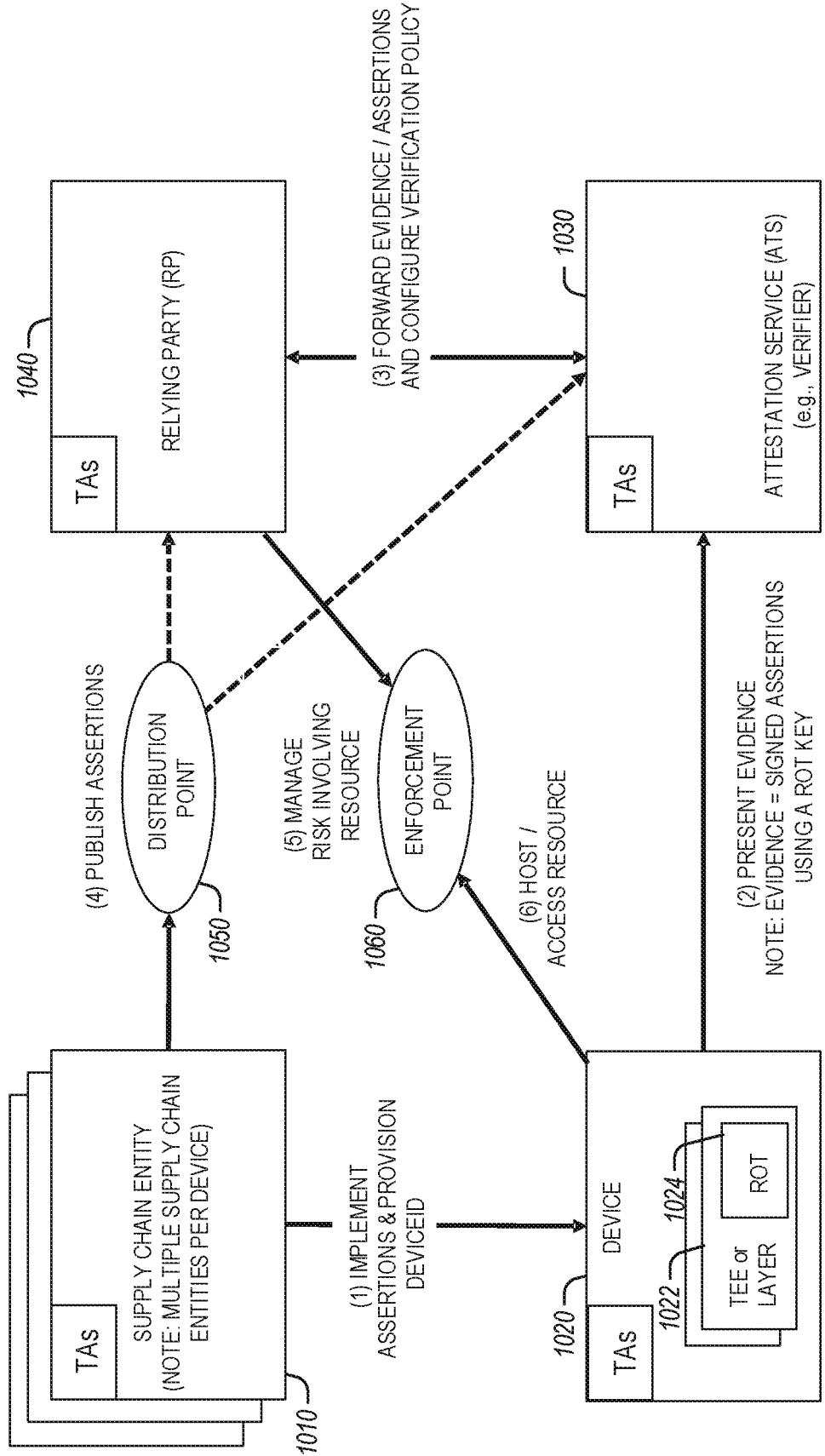
FIG. 10 illustrates a block diagram for a scope of attestation entity interoperability, depicting the duties of the entities and devices in a trusted arrangement, according to an example.

FIG. 10 illustrates a block diagram 1000 depicting the scope of attestation entity interoperability, which depicts the duties of the entities and devices in an attestation-supported system (e.g., the edge computing, MEC, or IoT systems discussed above with reference to FIGS. 1 to 7). In an example, a supply chain entity (SCE) 1010, such as a manufacturer, service provider, etc. may create, instantiate, and update the hardware and software of a device 1020 (e.g., a device which operates an accessible feature that is subject to attestation, as discussed above). This entity 1010 may also evaluate the trustworthiness of the device 1020 and publish or embed assertions to the device 1020. The SCE 1010 may also publish the assertions to a distribution point 1050, where the assertions may be passed to an attestation service 1030 or other verifier, or to a relying party 1040 (the party who will rely on the attestation). Each of the entities may include or be associated with various trust authorities (TAs) or trust assertions (including those established using the approach discussed below with reference to FIG. 11).

The device 1020 may be responsible for collecting assertions from the SCE 1010 (depicted in operation flow (1)), prove assertions are bound to the device 1020 (depicted in operation flow (2)), and present signed assertions to the attestation service or verifier (also depicted in operation flow (2)). The device 1020 may also send accessed resources to an enforcement point 1060 (depicted in operation (6)), which may then manage risks involving access to the resources (depicted in operation (5)).

The attestation service 1030 or other verifier may receive the signed assertion from the device 1020 (depicted in operation (3)), or the published assertions from the SCE 1010 (depicted in operation (4)). The attestation service 1030 may ensure the timeliness of the assertions, verify the device identity, and forward the assertions in the form of attestation results to the relying party 1040. The attestation service 1030 may also configure the verification policy.

The relying party 1040 may create a trust policy informed by the attestation service 1030, parse and verify the signed assertions from the device 1020, compare the trust policy to the signed assertions from the device 1020, and enforce the trust policy by sending information to the enforcement point 1060.

As a further explanation of the roles and terminology used in FIGS. 10-13, the following properties and definitions may apply:

For the Supply Chain Entity (or entities) (SCE) 1010: The SCE 1010 is the entity that creates, instantiates, and updates the hardware and software (firmware) of the device 1020. Device construction, composition and mutability properties are trust relevant properties called Attestation Assertions (AA). The SCE 1010 is most authoritative entity to make such assertions. How the device 1020 comes into being and how it finds its way to a customer determines its provenance. Thus, device provenance is a trust assertion that the SCE 1010 can facilitate.

For the Device 1020: Device trustworthiness varies according to its design. A device 1020 may employ hardening and isolation to improve trustworthiness. A Root-of-trust (ROT) 1024 at the device refers to anything that is the smallest trusted component. Typically, the ROT 1024 is immutable or has tight controls over mutability as the ROT 1024 performs a specific function. For instance, hardware fuses that provide uniqueness and entropy may be considered a ROT, but the entire device 1020 could be considered as a ROT (though doing so may not score high on a trustworthiness scale).

In the device 1020, the trusted execution environment (TEE) 1022 refers to a hardened place to execute trusted code (and, in some examples, the TEE may refer to a DICE layered architecture as defined by TCG specifications). The TEE 1022 will be a more trustworthy communications endpoint than an entire device. A layer deployed in the device 1020, in contrast, refers to one or more trusted environments that may have different trustworthiness properties due to firmware/software complexity—which usually increases with subsequent layers. Thus, a layer can also be a communications endpoint.

In the device 1020, device attestation involves establishing an endpoint and proving the endpoint has certain trust properties. Device AA may describe a subset of applicable trustworthiness properties. Attestation Evidence (AE), in the context of FIG. 10, is constructed by signing the AA using a key that is known to be bound to the Device 1020 (e.g., provided in FIG. 10 with operation (1)). Proof of device binding is established through device provenance with the help of one or more SCEs 1010. AE requires an information model and data model that supports semantic and syntactic interoperability.

For the Attestation Service (AtS) 1030 or other Verifier: The AtS 1030 is the opposite side of an attestation transaction (the Device 1020 is at the other side of the attestation transaction). The AtS 1030 receives Attestation Evidence (AE) (e.g., with the AE provided in FIG. 10 with operation (2)) and other proof of trust properties, and may evaluate some or all of it. AE requires an attestation policy against which evidence is evaluated. AE may fully, partially or not satisfy the policy. The AtS 1030 produces Attestation Results (AR) that may be consumed by Relying Parties. The AR may have a different information model and data model from the AE, or it may reuse the AE information and data models but include an AtS 1030 endorsement—meaning the AtS 1030 may countersign the AE to indicate that the AtS 1030 has validated it. AtS 1030 may consume attestation assertions from SCE as well, but must ensure it can be unambiguously associated with the appropriate AE.

For the Relying Party (RP) 1040: The RP 1040 consumes AR from a trusted AtS 1030 and evaluates it against its attestation policy (e.g., with the evidence as shown in FIG. 10 with operation (3)). The result is used to better manage risk and/or control access to RP resources. The RP 1040 may consume attestation assertions from the SCE 1010 as well, but must ensure they can be unambiguously associated with the appropriate AR. In further examples, the AtS 1030 and RP 1040 may be combined, typically when the RP 1040 is not a constrained environment. The RP 1040 and the Device 1020 share a context that motivates the attestation exchange (e.g. common application, service or resource).

The Enforcement Point (EP) 1060 controls access/exposure to the application, service or resource. The EP 1060 may be located on the RP 1040, the Device 1020, or elsewhere. The particular location is not significant, but it is relevant to the model as attestation is a pre-requisite to normal operation.

Figure 11:
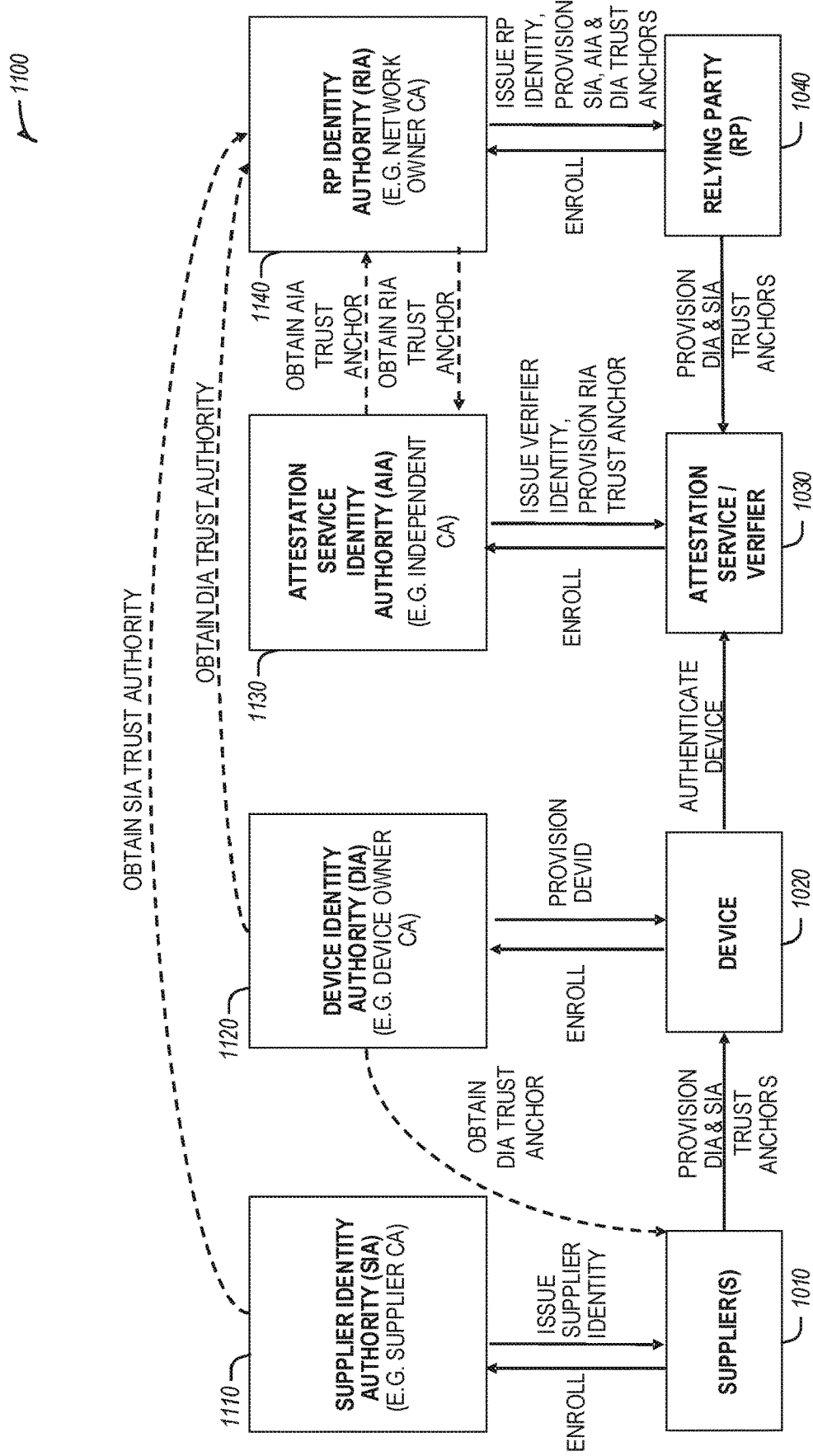
FIG. 11 illustrates a block diagram for a scope of trust model interoperability, depicting a trust attestation process according to an example.

FIG. 11 illustrates a block diagram 1100 depicting the scope of trust model interoperability detailing the trust attestation process. The supplier/SCE 1010, device 1020, AtS/verifier 1030, and relying party 1040 are interacting as described above in FIG. 10, but as a supplier identity authority (SIA) 1110 may issue a supplier identity to the SCE 1010 after the SCE 1010 enrolls with the SIA 1110. Similarly, the device 1020 may enroll with a device identity authority (DIA) 1120 and may receive a device ID from the DIA 1120.

The verifier 1030 may enroll with an AtS identity authority (AIA) 1130 which may issue a verifier identity to the AtS/verifier 1030. The relying party 1040 may enroll with a RP identity authority (RIA) 1140, which, in turn, may issue an RP identity provision to the relying party 1040. The RIA 1140 may also obtain a trust anchor (TA) from the SIA 1110, DIA 1120, and AIA 1130. The AIA 1130 may also receive a trust anchor from the RIA 1140, and the supplier 1010 may receive a trust anchor from the DIA 1120. Each entity may rely on some form of trust anchor provisioning to allow path validation.

In further examples, the roles of the various identity authorities may include:

At the Supplier Identity Authority (SIA) 1110: Supply Chain entities are expected to have identities (e.g., X.509 Certificate, Dun and Bradstreet #, Private Enterprise #, etc.). SIA refers to the entity that issues a SCE identity. This example assumes use of X.509 and presumes there is a well-known SIA trust anchor; however, other forms of entity identification can apply, such as W3C Decentralized ID (DID), symmetric key identity systems such as Kerberos, and peer-to-peer approaches such as pretty good privacy (PGP).

At the Device Identity Authority (DIA) 1120: Generally, one of the SCE issues an identity credential to a Device, hence a SCE is the DIA for the Device. In some cases, the device ID is derived from another key that serves as a local certificate authority (CA), hence another device key could be the DIA. This example assumes use of X.509 and presumes there is a DIA trust anchor (however, other forms of entity identification can apply).

At the AtS Identity Authority (AIA) 1130: Generally, the AtS 1030 is a service (e.g., WebServer) that is known to both the Device 1020 and RP 1040 through some form of discovery process or is provisioned. The AtS identity is issued by an entity that is trusted by both the RP 1040 and Device 1020 (e.g., a webtrust.org compliant CA). This example assumes use with X.509 and presumes there is a well-known AIA trust anchor (however, other forms of entity identification can apply).

At the Relying Party Identity Authority (RIA) 1140: The entity that issues an RP identity is the RIA 1140. The relying party 1040 may not require an identity except where interactions with an AtS 1030 may require RP authentication. This example assumes use with X.509 and presumes there is a well-known RIA trust anchor (however, other forms of entity identification can apply). Note: Each Entity relies on some form of trust anchor provisioning to allow path validation.

Figure 12:
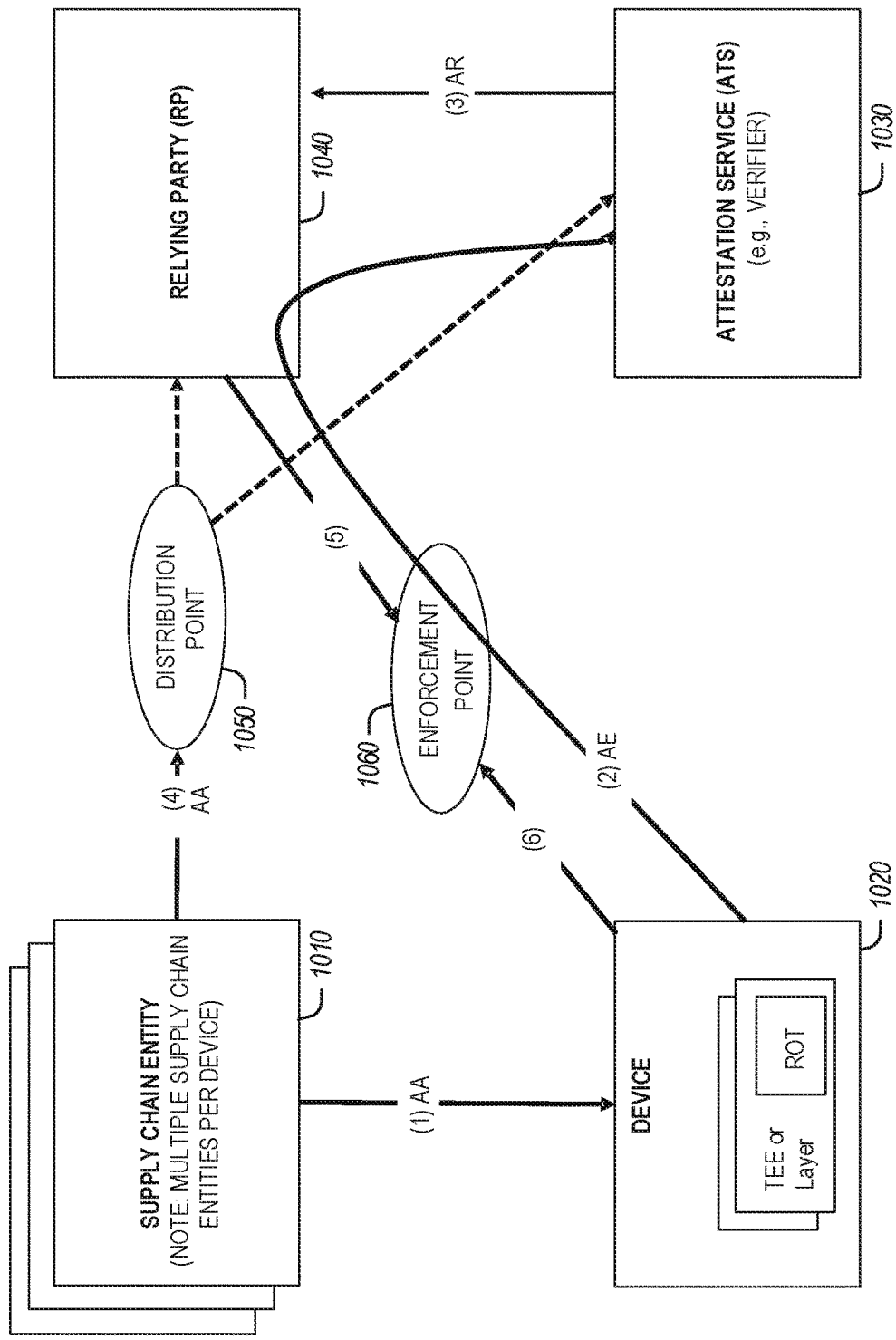
FIG. 12 illustrates a block diagram depicting indirection of an interface between attestation entities according to an example.

FIG. 12 illustrates a block diagram 1200 showing indirection of an interface between attestation entities as described above. In this example, multiple supply chain entities 1010 may send attestation assertions (AA) to a device 1020 or to a distribution point (depicted in operation (1)). The device 1020 may send attestation evidence (AE) to the ATS/verifier 1030 (depicted in operation (2)), which in turn may send the attestation result (AR) to the relying party 1040 (operation (3)). The AtS/verifier 1030 and the relying party 1040 may also receive attestation assertions from the distribution point 1050.

Figure 13:
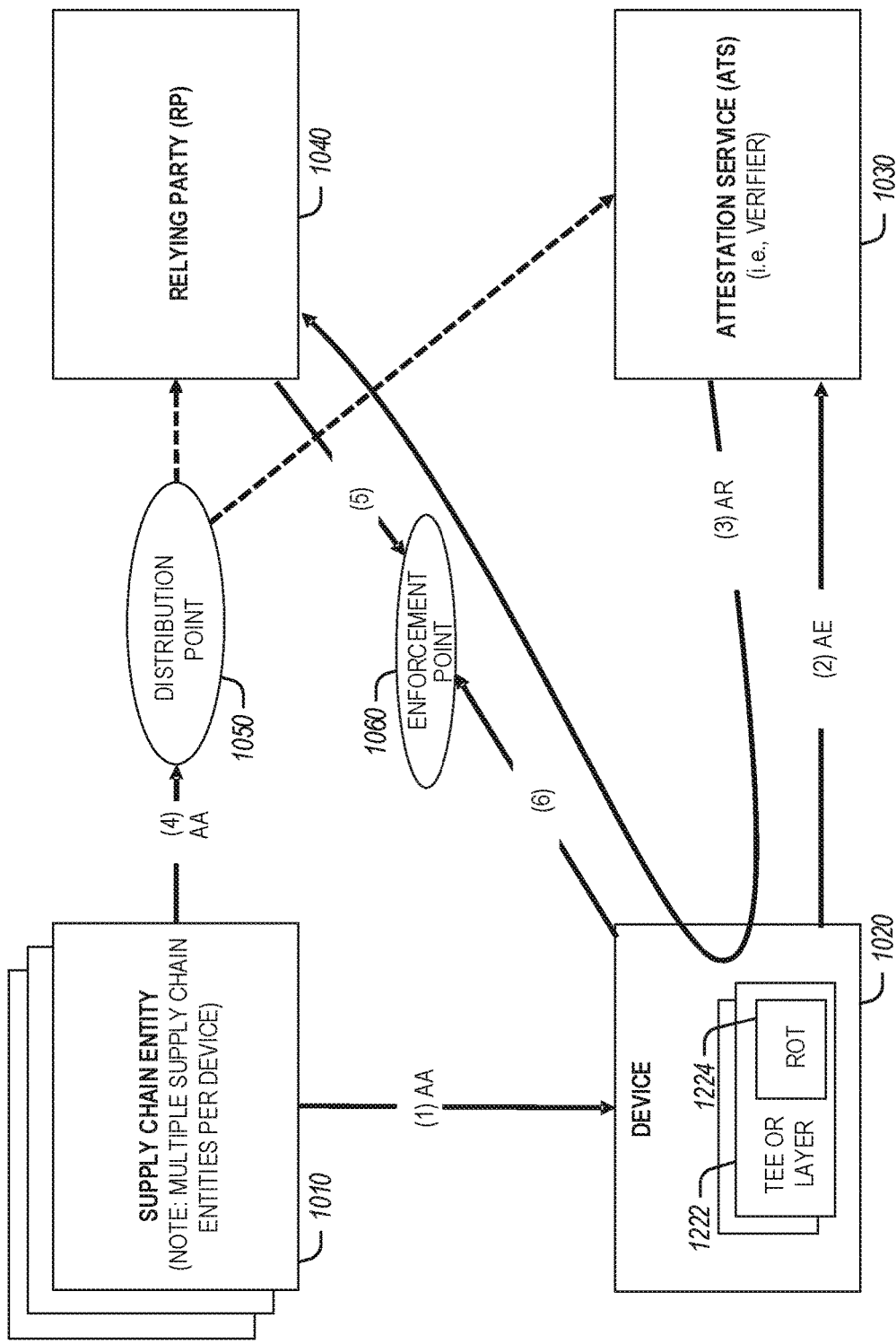
FIG. 13 illustrates a block diagram depicting indirection of an interface between attestation entities according to another example.

FIG. 13 illustrates a block diagram 1300 showing indirection of an interface between attestation entities as described above. In this example, the attestation service 1030 or verifier may send the attestation result back to the device 1020, which then may send the attestation result to the relying party 1040 (operation (3)).

In further examples, the interfaces provided among FIGS. 10-13 may be defined in the following manner:

(1) SCE 1010 ←→ Device 1020: This interface broadly refers to any interaction that may occur between the device 1020 in any stage of its manufacture with any of its SCEs 1010. This includes post customer delivery/deployment involving firmware updates, re-furbishing, security fixes, and the like. The SCE 1010 may provision device identities that facilitate supply chain provenance, firmware update and security fixes. The SCE 1010 may provision attestation assertions (AA) to the device 1020 or a pointer where AA can be collected by the device (or other entity).

(2) Device 1020 ←→ AtS 1030. This interface refers to conveyance of AE to an AtS, otherwise known as attestation. Attestation should precede normal operations such as data exchange or access to resources and services. This interface may occur via indirection when a network connection is established between the Device 1020 and the RP 1040 directly.

(3) AtS 1030 ←→ RP 1040. This interface refers to conveyance of AR to a RP or conveyance of attestation policy from the RP 1040 to the AtS 1030.

(4) SCE 1010 ←→ RP 1040. This interface refers to any form of interaction, publication or service where the SCE 1010 may provide information about the Device 1020 (or devices) that a RP 1040 may use to create attestation policy or to evaluate AR—this includes conveyance of AA, certificates and Trust Anchors (TA).

(5) RP 1040 ←→ EP 1060. This interface refers to actions the RP may take to restrict normal operation or employ risk mitigation strategies unless attestation checks are performed.

(6) Device 1020 ←→ EP 1060. This interface refers to access or hosting of a resource, service or application that is gated by attestation authorization.

In further examples, a use case context may justify combining of entities. For instance, the RP 1040 and the AtS 1030 may be combined if the RP 1040 is not a constrained entity; the SCE 1010 and the AtS 1030 may be combined if the 1010 SCE has AtS services bundled with products; and the SCE 1010 and the Device 1020 may be combined if the Device 1020 is software or virtualized. Further, by combining the RP 1040 with the AtS 1030 (e.g., the Verifier) it is possible to construct sequences of RP-AtS entities that transform a first set of assertions into a second set of assertions that are processed by a second AtS-RP and so forth.

Also, in further examples, the producer-consumer messages referenced in FIGS. 10-13, may be defined as follows:

AA—Attestation Assertions: AA=[Assertion(s)]Signature_SCE

AE—Attestation Evidence: AE=[Assertion(s)]Signature_Device or AE=[[Assertion(s)]Signature_SCE]Signature_Device AR—Attestation Result: AR=[Assertion(s)]Signature_ATS; where Assertions could be an aggregation of other (finer grained) Assertions RA—Reference Assertions: RA=[Assertion(s)]Signature_RP, or RA=[Assertion(s)]Signature_RP-Authority (e.g., an entity that speaks for the RP) (Note: RA can be compared to AR such that: AR 'satisfies' the RA or not)

SCE→AA, [AA]$K_{SCE}$→Device, RP, AtS, SCE

Device→AE=([AA]$K_{Device}$ OR [[AA]$K_{SCE}$]$K_{Device}$ OR ([AA]$K_{SCE}$, [$K_{SCE}$]$K_{Device}$) OR [$K_{SCE}$]$K_{Device}$)→AtS AtS→[AR]$K_{AtS}$ OR [AE]$K_{AtS}$ OR [$K_{SCE}$]$K_{AtS}$ OR [$K_{Device}$]$K_{AtS}$→RP RP_Authority→RA=([$K_{SCE}$, $K_{Device}$, $K_{AtS}$, $K_{RP}$, AA, AE, AR]$K_{RP\_Authority}$)→RP, AtS, Where X→—Denotes Producer, →X—Denotes Consumer, and [X]Key—Denotes signing Based on these semantics and interfaces, several categories of assertions are reasonable to consider. First, class identification may include assertions that in some way identify a class of device; for example, the triple {vendor, model, version} or a hash of firmware.

Hardening and Design Assertions—may include assertions related to how the device resources are partitioned and/or hardened from attack. For example, the use of TEE, trusted boot capability or other layering.

Composition Assertions—may include assertions related to the software and hardware ingredients. A software update manifest may semantically represent software composition assertions.

Provenance Assertions—may include assertions related to the chain-of-custody during manufacturing, supply chain and possibly even post deployment, and generally implies use of device IDs that are unique to a device instance.

Temporality Assertions—may include assertions related to the freshness of trust. For example, the time since the last attestation check was performed or the time since the last firmware update.

Proximity Assertions—may include Assertions related to the absolute or relative location of the device. (Note: This category may involve cases where contextual computing or telemetry may overlap.)

In various examples, an attestation provider (which encompasses the attestation service or verifier examples provided above) may be provided from a standalone system, node, or device, a virtualized system (e.g., virtual machine), a container or sidecar instance, a hosted service, or other form of software or hardware (or combination of software and hardware). Further, in some edge computing system deployments, the attestation provider may be provided from a combination of multiple systems, nodes, entities, or components which work in concert with one another to function as an attestation provider. Additionally, different functional roles of the attestation provider (e.g., generating a token, versus attesting or validating security information) may be operated by different entities or components in the edge computing system. The attestation provider may be operated, orchestrated, or controlled by one or multiple entities, such as from integration or control from multiple of the trusted entities indicated in FIG. 11. It will be understood that the attestation provider may be implemented at many locations within an edge computing system, and notably, many locations in a MEC implementation which includes multiple platforms, hosts, applications, and services coordinated among multiple physical and virtual system instances.

Figure 14:
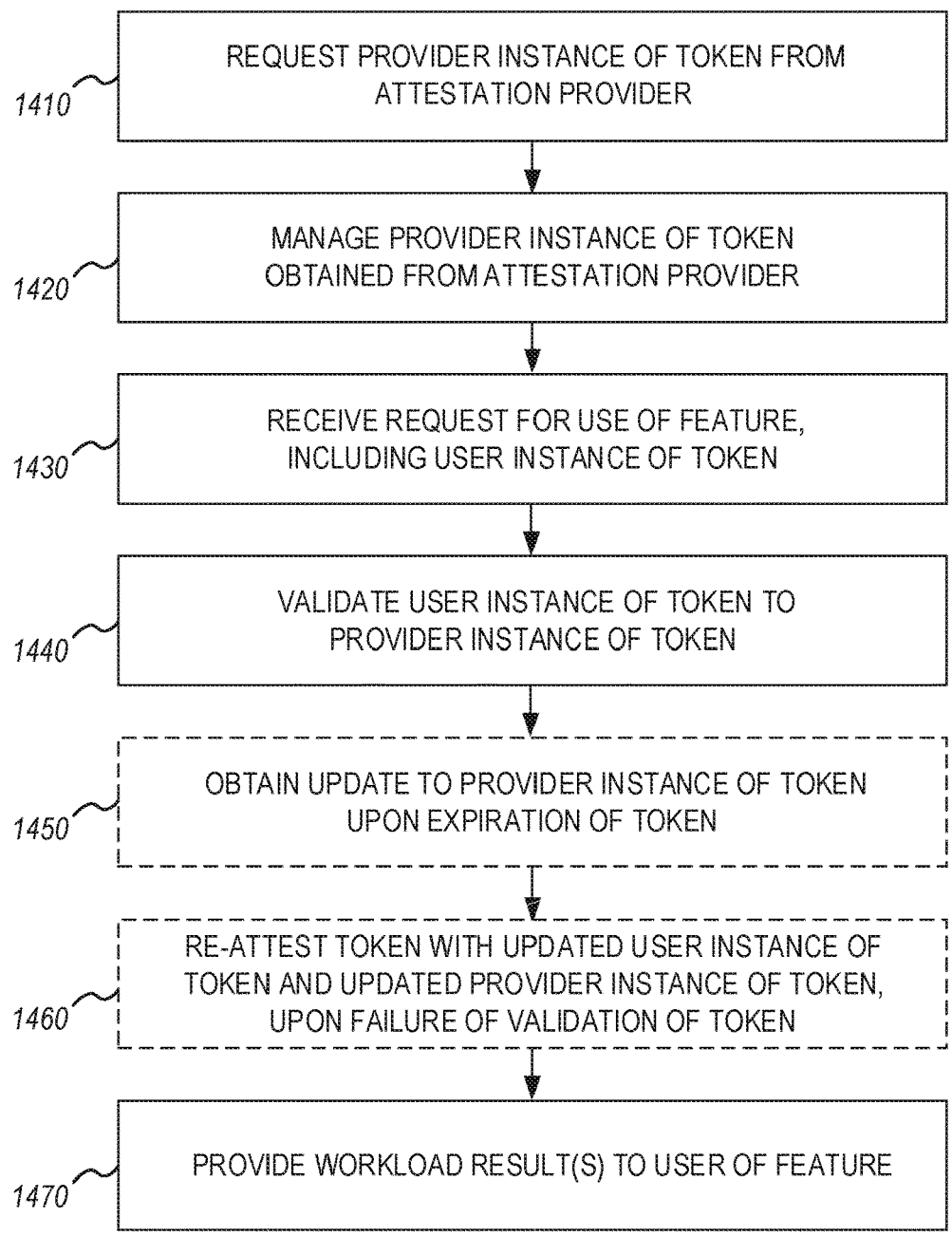
FIG. 14 illustrates a flowchart of an example process for establishing and using attestation tokens, according to an example.

FIG. 14 illustrates a flowchart 1400 of an example process for establishing and using attestation tokens. The following flowchart 1400 is illustrated from the perspective of an edge computing device which includes an accessible feature (e.g., resource, service, etc.) to be used by a prospective user (e.g., user device) after attestation. However, it will be understood that other corresponding operations may also be implemented by or on behalf of other entities. In an example, the prospective user of the feature is a user equipment (e.g., smartphone or a mobile computing device), with the user equipment being connected to provide a request for use of the accessible feature to the edge computing device. In a further example, the edge computing device and the user equipment are operable in edge computing system (e.g., a MEC or other system discussed herein), with the request being provided as part of a workload that uses the accessible feature.

The flowchart 1400 begins with operation 1410, performed by the edge computing device, to request a provider instance of an attestation token from an attestation provider. This token is generated by the attestation provider to indicate a proof of attestation, as provided by the attestation provider, that represents attestation of an accessible feature of the edge computing device. In an example, this accessible feature is a resource, service, entity, or property of the edge computing device, that is accessible by a client device (e.g., a device operated by a prospective user) according to characteristics of the feature. In a further example, the token includes data to indicate a trust level designation for the feature as attested by the attestation provider. This token may be established, generated, and distributed according to the aspects illustrated in FIGS. 8 to 13 (including with the use of an orchestrator, attestation service, or supply chain entity, and the involvement of identity authorities, as discussed above).

The flowchart 1400 continues with operation 1420, performed at the edge computing device, to manage the provider instance of the token (e.g., the token that is obtained from the attestation provider). This management may include local storage of the provider instance of the token, at a storage device, or another accessible location. In a further example, token is generated by a single-sign-on (SSO) server of the attestation provider, and the token is communicated to the edge computing device using an SSO payload provided by the SSO server. Also in other examples, the token is contributed to a blockchain by the attestation provider, for verification by a client device, the edge computing device, or other entities.

The flowchart 1400 continues with operation 1430, performed at the edge computing device, to receive a request for use of feature. This request includes a user instance of the token, with this user instance of the token originating from the attestation provider (e.g., to attest to some aspect of the accessible feature). Other methods of receiving and invoking the use of the feature (e.g., for some workload, action, etc.) may be involved.

The flowchart 1400 continues with operation 1440, performed at the edge computing device, to validate the user instance of the token, relative to the provider instance of the token. This validation may include a comparison, match, or other verification operation. In an example, validation of the provider instance of the token at the edge computing device is performed to verify the expiration data associated with the provider instance of the token. In an example, the token includes an authentication key, as the authentication key is generated by a trusted execution environment of the attestation provider to identify authenticity of the token to a client device (or, to the edge computing device). In an example, in response to success of the verification, a result of the verification success is transmitted to the prospective user of the feature, to indicate successful use or prospective use of the accessible feature.

The flowchart 1400 continues with optional operation 1450, which is performed based on expiration of the token (e.g., validation of the provider instance of the token, indicating an expired token). In response to the expiration of the provider instance of the token, the operations (e.g., operations 1410, 1420) to request and manage the provider instance of the token are repeated, to obtain an update to the provider instance of the token. This update to the provider instance of the token will provide updated expiration data.

The flowchart 1400 continues with optional operation 1460, which is performed based on failure to validate the token (e.g., from a failure of validation in operation 1440, or other failure of matching, comparison, or otherwise). In response to failure of the verification, operations are initiated or repeated to re-attest the token (e.g., by performing operations 1410, 1420, for an updated token). This results in the attestation provider providing a provider instance of an updated token to the edge computing device and a user instance of this updated token to the prospective user of the feature.

The flowchart 1400 continues at operation 1470 with the use of the accessible feature, which may include providing results of a workload (e.g., executed or performed using the service or resource) to the user of the feature. After validating attestation, a workload result (e.g., provided using the accessible feature) may be provided, transmitted, or indicated to the user of the feature.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional Notes & Examples

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example 1 is an edge computing device in an edge computing system, comprising: processing circuitry; and a memory device comprising instructions stored thereon, wherein the instructions, when executed by the processing circuitry, configure the processing circuitry to perform operations to: obtain, from an attestation provider, a provider instance of a token, the token representing a proof of attestation, by the attestation provider, of an accessible feature of the edge computing device, with the token including data to indicate trust level designations for the feature as attested by the attestation provider; receive, from a prospective user of the feature, a request for use of the feature at the edge computing device, the request including a user instance of the token, wherein the user instance of the token originates from the attestation provider; and provide access to the feature based on a verification of the user instance of the token with the provider instance of the token, the verification to confirm attestation of the trust level designations for the feature.

In Example 2, the subject matter of Example 1 includes, subject matter where the instructions further configure the processing circuitry to perform operations to: request, from the attestation provider, the provider instance of the token, wherein the attestation provider associates the token with a state of the feature.

In Example 3, the subject matter of Example 2 includes, subject matter where the instructions further configure the processing circuitry to perform operations to: validate the provider instance of the token at the edge computing device, based on expiration data associated with the provider instance of the token; wherein operations to request the provider instance of the token are repeated, to obtain an update to the provider instance of the token associated with updated expiration data.

In Example 4, the subject matter of Examples 1-3 includes, subject matter where the feature is a resource, service, entity, or property of the edge computing device, that is accessible by a client device according to characteristics of the feature.

In Example 5, the subject matter of Examples 1-4 includes, subject matter where the token is contributed to a blockchain by the attestation provider, for verification by a client device.

In Example 6, the subject matter of Examples 1-5 includes, subject matter where the token includes an authentication key, and wherein the authentication key is generated by a trusted execution environment of the attestation provider, to identify authenticity of the token to a client device.

In Example 7, the subject matter of Examples 1-6 includes, subject matter where the token is generated by a single-sign-on (SSO) server of the attestation provider, wherein the token is communicated using an SSO payload provided by the SSO server.

In Example 8, the subject matter of Examples 1-7 includes, subject matter where the instructions further configure the processing circuitry to perform operations to: perform the verification of the user instance of the token with the provider instance of the token; and in response to failure of the verification, initiate operations to re-attest the token, wherein the attestation provider provides a provider instance of an updated token to the edge computing device and a user instance of the updated token to the prospective user of the feature; wherein the operations to provide access to the feature based on verification of the token are provided based on verification of the user instance of the updated token with the provider instance of the updated token.

In Example 9, the subject matter of Examples 1-8 includes, subject matter where the instructions further configure the processing circuitry to perform operations to: in response to success of the verification, transmit a result to the prospective user of the feature, based on use of the accessible feature.

In Example 10, the subject matter of Examples 1-9 includes, subject matter where the prospective user of the feature is a user equipment, the user equipment being connected to provide the request to the edge computing device using the edge computing system, wherein the request is provided as part of a workload that uses the feature.

In Example 11, the subject matter of Example 10 includes, subject matter where the user instance of the token is assigned to the user equipment, from an orchestrator of the edge computing system, in connection with usage of the feature according to a service level agreement (SLA) established in the edge computing system, and wherein the orchestrator associates the token with the SLA based on the attestation of the accessible feature as established by the attestation provider.

In Example 12, the subject matter of Examples 10-11 includes, subject matter where the edge computing system is a Mobile Access Edge Computing (MEC) system operating according to a MEC specification, wherein the edge computing device is a MEC host, and wherein the feature is a MEC resource accessible within the MEC host.

In Example 13, the subject matter of Examples 1-12 includes, a storage device, wherein the provider instance of the token is stored locally at the edge computing device using the storage device.

Example 14 is an orchestration computing device, comprising: processing circuitry; and a memory device comprising instructions stored thereon, wherein the instructions, when executed by the processing circuitry, configure the processing circuitry to perform operations to: obtain, from an attestation provider, a provider instance of a token, the token representing a proof of attestation, by the attestation provider, of an accessible feature of an edge computing node, with the token including data to indicate trust level designations for the feature as attested by the attestation provider; receive, from a prospective user of the feature, a request for a service level agreement (SLA) to define usage of the feature; assign the provider instance of the token to the SLA, based on attestation of the accessible feature as established by the attestation provider, to establish a user instance of the token; and provide, to the prospective user of the feature, the SLA and the user instance of the token, to enable use of the token to confirm attestation of the trust level designations for the feature.

In Example 15, the subject matter of Example 14 includes, subject matter where the attestation provider associates the token with a state of the feature.

In Example 16, the subject matter of Examples 14-15 includes, subject matter where the feature is a resource, service, entity, or property of the edge computing node, that is accessible by a client node according to characteristics of the feature.

In Example 17, the subject matter of Examples 14-16 includes, subject matter where the token is contributed to a blockchain by the attestation provider, for verification by a client node.

In Example 18, the subject matter of Examples 14-17 includes, subject matter where the token includes an authentication key, and wherein the authentication key is generated by a trusted execution environment of the attestation provider, to identify authenticity of the token to a client node.

In Example 19, the subject matter of Examples 14-18 includes, subject matter where the token is generated by a single-sign-on (SSO) server of the attestation provider, wherein the token is communicated using an SSO payload provided by the SSO server.

In Example 20, the subject matter of Examples 14-19 includes, subject matter where the prospective user of the feature is a user equipment, the user equipment being connected to provide the request to the edge computing node, wherein the request is provided as part of a workload that uses the feature according to the SLA.

Example 21 is an attestation service provider computing device, comprising: processing circuitry; and a memory device comprising instructions stored thereon, wherein the instructions, when executed by the processing circuitry, configure the processing circuitry to perform operations to: receive, from an edge computing device, a request for a provider instance of a token, the token representing a proof of attestation, by the attestation service provider computing device, of an accessible feature of the edge computing device; create a provider instance and a user instance of the token, the token including data to indicate trust level designations for the feature as attested by the attestation service provider computing device; provide, to the edge computing device, the provider instance of the token; and provide, to a client device, the user instance of the token; wherein access to the feature is provided based on verification of the user instance of the token with the provider instance of the token, the verification to confirm attestation of the trust level designations for the feature.

In Example 22, the subject matter of Example 21 includes, subject matter where the instructions further configure the processing circuitry to perform operations to: associate the token with a state of the feature on the edge computing device.

In Example 23, the subject matter of Examples 21-22 includes, subject matter where the instructions further configure the processing circuitry to perform operations to: perform verification of the feature on the edge computing device, based on an attestation exchange.

In Example 24, the subject matter of Examples 21-23 includes, subject matter where the feature is a resource, service, entity, or property of the edge computing device, that is accessible by the client device according to characteristics of the feature.

In Example 25, the subject matter of Examples 21-24 includes, subject matter where the instructions further configure the processing circuitry to perform operations to: contribute the token to a blockchain, for verification by the client device.

In Example 26, the subject matter of Examples 21-25 includes, subject matter where the token includes an authentication key, and wherein the authentication key is generated by a trusted execution environment of the attestation service provider computing device, to identify authenticity of the token to the client device.

In Example 27, the subject matter of Examples 21-26 includes, subject matter where the token is generated by a single-sign-on (SSO) server of the attestation service provider computing device, wherein the token is communicated using an SSO payload provided by the SSO server.

In Example 28, the subject matter of Examples 21-27 includes, subject matter where the user instance of the token is provided to the client device via an orchestrator.

In Example 29, the subject matter of Example 28 includes, subject matter where the user instance of the token is assigned to the client device from the orchestrator, in connection with usage of the feature according to a service level agreement (SLA) established using the orchestrator, and wherein the orchestrator associates the token with the SLA based on the attestation of the accessible feature as established by the attestation service provider computing device.

Example 30 is a client computing device, comprising: processing circuitry; and a memory device comprising instructions stored thereon, wherein the instructions, when executed by the processing circuitry, configure the processing circuitry to perform operations to: obtain, from an attestation provider, a user instance of a token, the token representing a proof of attestation, by the attestation provider, of an accessible feature of an edge computing device, with the token including data to indicate trust level designations for the feature as attested by the attestation provider; provide, to the edge computing device, a request for use of the feature at the edge computing device, the request including the user instance of the token; and receive, from the edge computing device, data based on the use of the feature of the edge computing device, in response to verification at the edge computing device of the user instance of the token with a provider instance of the token, wherein the verification is used to confirm attestation of the trust level designations for the feature.

In Example 31, the subject matter of Example 30 includes, subject matter where the feature is a resource, service, entity, or property of the edge computing device, that is accessible by the client computing device according to characteristics of the feature.

In Example 32, the subject matter of Examples 30-31 includes, subject matter where the attestation provider associates the token with a state of the feature.

In Example 33, the subject matter of Examples 30-32 includes, subject matter where the token is contributed to a blockchain by the attestation provider, for verification by the client computing device.

In Example 34, the subject matter of Examples 30-33 includes, subject matter where the token includes an authentication key, and wherein the authentication key is generated by a trusted execution environment of the attestation provider, to identify authenticity of the token to the client computing device.

In Example 35, the subject matter of Examples 30-34 includes, subject matter where the token is generated by a single-sign-on (SSO) server of the attestation provider, wherein the token is communicated to the client computing device using an SSO payload provided by the SSO server.

In Example 36, the subject matter of Examples 30-35 includes, subject matter where the instructions further configure the processing circuitry to perform operations to: initiate operations to re-attest the token, in response to failure of the verification, wherein the attestation provider provides a provider instance of an updated token to the edge computing device and a user instance of the updated token to the client computing device; provide the user instance of the updated token to the edge computing device; and obtain access to the feature based on verification, at the edge computing device, of the user instance of the updated token with the provider instance of the updated token.

In Example 37, the subject matter of Examples 30-36 includes, subject matter where the client computing device is a user equipment operating in an edge computing system, the user equipment being connected to provide the request to the edge computing device using the edge computing system, wherein the request is provided as part of a workload that uses the feature.

In Example 38, the subject matter of Example 37 includes, subject matter where the user instance of the token is assigned to the user equipment, from an orchestrator of the edge computing system, in connection with usage of the feature according to a service level agreement (SLA) established in the edge computing system, and wherein the orchestrator associates the token with the SLA based on the attestation of the accessible feature as established by the attestation provider.

In Example 39, the subject matter of Examples 37-38 includes, subject matter where the edge computing system is a Mobile Access Edge Computing (MEC) system operating according to a MEC specification, wherein the edge computing device is a MEC host, and wherein the feature is a MEC resource accessible within the MEC host.

Example 40 is a method performed by an edge computing device, comprising: obtaining, from an attestation provider, a provider instance of a token, the token representing a proof of attestation, by the attestation provider, of an accessible feature of the edge computing device, with the token including data to indicate trust level designations for the feature as attested by the attestation provider; receiving, from a prospective user of the feature, a request for use of the feature at the edge computing device, the request including a user instance of the token, wherein the user instance of the token originates from the attestation provider; and providing access to the feature based on a verification of the user instance of the token with the provider instance of the token, the verification to confirm attestation of the trust level designations for the feature.

In Example 41, the subject matter of Example 40 includes, requesting, from the attestation provider, the provider instance of the token, wherein the attestation provider associates the token with a state of the feature.

In Example 42, the subject matter of Example 41 includes, validating the provider instance of the token at the edge computing device, based on expiration data associated with the provider instance of the token; wherein requesting the provider instance of the token is repeated, to obtain an update to the provider instance of the token associated with updated expiration data.

In Example 43, the subject matter of Examples 40-42 includes, subject matter where the feature is a resource, service, entity, or property of the edge computing device, that is accessible by a client device according to characteristics of the feature.

In Example 44, the subject matter of Examples 40-43 includes, subject matter where the token is contributed to a blockchain by the attestation provider, for verification by a client device.

In Example 45, the subject matter of Examples 40-44 includes, subject matter where the token includes an authentication key, and wherein the authentication key is generated by a trusted execution environment of the attestation provider, to identify authenticity of the token to a client device.

In Example 46, the subject matter of Examples 40-45 includes, subject matter where the token is generated by a single-sign-on (SSO) server of the attestation provider, wherein the token is communicated using an SSO payload provided by the SSO server.

In Example 47, the subject matter of Examples 40-46 includes, performing the verification of the user instance of the token with the provider instance of the token; and in response to failure of the verification, initiating operations to re-attest the token, wherein the attestation provider provides a provider instance of an updated token to the edge computing device and a user instance of the updated token to the prospective user of the feature; wherein the operations to provide access to the feature based on verification of the token are provided based on verification of the user instance of the updated token with the provider instance of the updated token.

In Example 48, the subject matter of Examples 40-47 includes, transmitting a result to the prospective user of the feature, based on use of the accessible feature, in response to success of the verification.

In Example 49, the subject matter of Examples 40-48 includes, subject matter where the prospective user of the feature is a user equipment, the user equipment being connected to provide the request to the edge computing device using the edge computing system, wherein the request is provided as part of a workload that uses the feature.

In Example 50, the subject matter of Example 49 includes, subject matter where the user instance of the token is assigned to the user equipment, from an orchestrator of the edge computing system, in connection with usage of the feature according to a service level agreement (SLA) established in the edge computing system, and wherein the orchestrator associates the token with the SLA based on the attestation of the accessible feature as established by the attestation provider.

In Example 51, the subject matter of Examples 49-50 includes, subject matter where the edge computing system is a Mobile Access Edge Computing (MEC) system operating according to a MEC specification, wherein the edge computing device is a MEC host, and wherein the feature is a MEC resource accessible within the MEC host.

Example 52 is at least one machine-readable storage medium including instructions, wherein the instructions, when executed by a processing circuitry of an edge computing device, cause the processing circuitry to perform operations of any of Examples 40 to 51.

Example 53 is a method performed by an orchestration computing device, comprising: obtaining, from an attestation provider, a provider instance of a token, the token representing a proof of attestation, by the attestation provider, of an accessible feature of an edge computing node, with the token including data to indicate trust level designations for the feature as attested by the attestation provider; receiving, from a prospective user of the feature, a request for a service level agreement (SLA) to define usage of the feature; assigning the provider instance of the token to the SLA, based on attestation of the accessible feature as established by the attestation provider, to establish a user instance of the token; and providing, to the prospective user of the feature, the SLA and the user instance of the token, to enable use of the token to confirm attestation of the trust level designations for the feature.

In Example 54, the subject matter of Example 53 includes, subject matter where the attestation provider associates the token with a state of the feature.

In Example 55, the subject matter of Examples 53-54 includes, subject matter where the feature is a resource, service, entity, or property of the edge computing node, that is accessible by a client node according to characteristics of the feature.

In Example 56, the subject matter of Examples 53-55 includes, subject matter where the token is contributed to a blockchain by the attestation provider, for verification by a client node.

In Example 57, the subject matter of Examples 53-56 includes, subject matter where the token includes an authentication key, and wherein the authentication key is generated by a trusted execution environment of the attestation provider, to identify authenticity of the token to a client node.

In Example 58, the subject matter of Examples 53-57 includes, subject matter where the token is generated by a single-sign-on (SSO) server of the attestation provider, wherein the token is communicated using an SSO payload provided by the SSO server.

In Example 59, the subject matter of Examples 53-58 includes, subject matter where the prospective user of the feature is a user equipment, the user equipment being connected to provide the request to the edge computing node, wherein the request is provided as part of a workload that uses the feature according to the SLA.

Example 60 is at least one machine-readable storage medium including instructions, wherein the instructions, when executed by a processing circuitry of an edge computing device, cause the processing circuitry to perform operations of any of Examples 53 to 59.

Example 61 is a method performed by an attestation service provider computing device, comprising: receiving, from an edge computing device, a request for a provider instance of a token, the token representing a proof of attestation, by the attestation service provider, of an accessible feature of the edge computing device; creating a provider instance and a user instance of the token, the token including data to indicate trust level designations for the feature as attested by the attestation service provider computing device; providing, to the edge computing device, the provider instance of the token; and providing, to a client device, the user instance of the token; wherein access to the feature is provided based on verification of the user instance of the token with the provider instance of the token, the verification to confirm attestation of the trust level designations for the feature.

In Example 62, the subject matter of Example 61 includes, associating the token with a state of the feature on the edge computing device.

In Example 63, the subject matter of Examples 61-62 includes, performing verification of the feature on the edge computing device, based on an attestation exchange.

In Example 64, the subject matter of Examples 61-63 includes, subject matter where the feature is a resource, service, entity, or property of the edge computing device, that is accessible by the client device according to characteristics of the feature.

In Example 65, the subject matter of Examples 61-64 includes, contributing the token to a blockchain, for verification by the client device.

In Example 66, the subject matter of Examples 61-65 includes, subject matter where the token includes an authentication key, and wherein the authentication key is generated by a trusted execution environment of the attestation service provider computing device, to identify authenticity of the token to the client device.

In Example 67, the subject matter of Examples 61-66 includes, subject matter where the token is generated by a single-sign-on (SSO) server of the attestation service provider computing device, wherein the token is communicated using an SSO payload provided by the SSO server.

In Example 68, the subject matter of Examples 61-67 includes, subject matter where the user instance of the token is provided to the client device via an orchestrator.

In Example 69, the subject matter of Examples 61-68 includes, subject matter where the user instance of the token is assigned to the client device from an orchestrator, in connection with usage of the feature according to a service level agreement (SLA) established using the orchestrator, and wherein the orchestrator associates the token with the SLA based on the attestation of the accessible feature as established by the attestation service provider computing device.

Example 70 is at least one machine-readable storage medium including instructions, wherein the instructions, when executed by a processing circuitry of an orchestration computing device, cause the processing circuitry to perform operations of any of Examples 61 to 69.

Example 71 is a method performed by a client computing device, comprising: obtaining, from an attestation provider, a user instance of a token, the token representing a proof of attestation, by the attestation provider, of an accessible feature of an edge computing device, with the token including data to indicate trust level designations for the feature as attested by the attestation provider; providing, to the edge computing device, a request for use of the feature at the edge computing device, the request including the user instance of the token; and receiving, from the edge computing device, data based on the use of the feature of the edge computing device, in response to verification at the edge computing device of the user instance of the token with a provider instance of the token, wherein the verification is used to confirm attestation of the trust level designations for the feature.

In Example 72, the subject matter of Example 71 includes, subject matter where the feature is a resource, service, entity, or property of the edge computing device, that is accessible by the client computing device according to characteristics of the feature.

In Example 73, the subject matter of Examples 71-72 includes, subject matter where the attestation provider associates the token with a state of the feature.

In Example 74, the subject matter of Examples 71-73 includes, subject matter where the token is contributed to a blockchain by the attestation provider, for verification by the client computing device.

In Example 75, the subject matter of Examples 71-74 includes, subject matter where the token includes an authentication key, and wherein the authentication key is generated by a trusted execution environment of the attestation provider, to identify authenticity of the token to the client computing device.

In Example 76, the subject matter of Examples 71-75 includes, subject matter where the token is generated by a single-sign-on (SSO) server of the attestation provider, wherein the token is communicated to the client computing device using an SSO payload provided by the SSO server.

In Example 77, the subject matter of Examples 71-76 includes, initiating operations to re-attest the token, in response to failure of the verification, wherein the attestation provider provides a provider instance of an updated token to the edge computing device and a user instance of the updated token to the client computing device; providing the user instance of the updated token to the edge computing device; and obtaining access to the feature based on verification, at the edge computing device, of the user instance of the updated token with the provider instance of the updated token.

In Example 78, the subject matter of Examples 71-77 includes, subject matter where the client computing device is a user equipment operating in an edge computing system, the user equipment being connected to provide the request to the edge computing device using the edge computing system, wherein the request is provided as part of a workload that uses the feature.

In Example 79, the subject matter of Example 78 includes, subject matter where the user instance of the token is assigned to the user equipment, from an orchestrator of the edge computing system, in connection with usage of the feature according to a service level agreement (SLA) established in the edge computing system, and wherein the orchestrator associates the token with the SLA based on the attestation of the accessible feature as established by the attestation provider.

In Example 80, the subject matter of Examples 78-79 includes, subject matter where the edge computing system is a Mobile Access Edge Computing (MEC) system operating according to a MEC specification, wherein the edge computing device is a MEC host, and wherein the feature is a MEC resource accessible within the MEC host.

Example 81 is at least one machine-readable storage medium including instructions, wherein the instructions, when executed by a processing circuitry of an orchestration computing device, cause the processing circuitry to perform operations of any of Examples 71 to 80.

Example 82 may include one or more non-transitory computer-readable media comprising instructions to cause an electronic device, upon execution of the instructions by one or more processors of the electronic device, to perform one or more elements of a method described in or related to any of Examples 1-81, or any other method or process described herein.

Example 83 may include an apparatus comprising logic, modules, or circuitry to perform one or more elements of a method described in or related to any of Examples 1-81, or any other method or process described herein.

Example 84 may include a method, technique, or process as described in or related to any of Examples 1-81, or portions or parts thereof.

Example 85 may include an apparatus comprising: one or more processors and one or more computer readable media comprising instructions that, when executed by the one or more processors, cause the one or more processors to perform the method, techniques, or process as described in or related to any of Examples 1-81, or portions thereof.

Example 86 may include a signal as described in or related to any of examples 1-81, or portions or parts thereof.

Example 87 may include a signal in a wireless network as described in or related to any of Examples 1-81, or as otherwise shown and described herein.

Example 88 may include a method of performing or coordinating communications in a wireless network as described in or related to any of Examples 1-81, or as otherwise shown and described herein.

Example 89 may include a device for processing communication as described in or related to any of Examples 1-81, or as otherwise shown and described herein.

Example 90 is a network comprising respective devices and device communication mediums for performing any of the operations of Examples 1-81, or as otherwise shown and described herein.

Example 91 is an edge cloud computing device implementation comprising processing nodes and computing units adapted for performing any of the operations of Examples 1-81, or as otherwise shown and described herein.

Example 92 is an apparatus comprising means to implement of any of Examples 1-81.

Example 93 is a system to implement of any of Examples 1-92.

Example 94 is a method to implement of any of Examples 1-92.

In the above Detailed Description, various features may be grouped together to streamline the disclosure. However, claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An edge computing device in an edge computing system, comprising:
   processing circuitry; and
   a memory device comprising instructions stored thereon, wherein the instructions, when executed by the processing circuitry, configure the processing circuitry to perform operations to:
      request a token from an attestation provider, wherein the attestation provider associates data in the token with an attested state of an accessible feature of the edge computing device;
      obtain, from the attestation provider, a provider instance of the token, the provider instance of the token representing a proof of attestation, generated by the attestation provider, of the feature of the edge computing device, wherein the provider instance of the token includes data to indicate trust level designations for the feature as attested by the attestation provider;
      receive, from a prospective user of the feature, a request for use of the feature at the edge computing device, the request including a user instance of the token, wherein the user instance of the token originates from the attestation provider, and wherein the user instance of the token includes the data to indicate the trust level designations for the feature as attested by the attestation provider; and
      provide access to the feature based on a verification of the data of the user instance of the token with the data of the provider instance of the token, the verification to confirm attestation of the trust level designations for the feature.

2. The edge computing device of claim 1, wherein the instructions further configure the processing circuitry to perform operations to:

validate the provider instance of the token at the edge computing device, based on expiration data associated with the provider instance of the token;

wherein operations to request the provider instance of the token are repeated, to obtain an update to the provider instance of the token associated with updated expiration data.

3. The edge computing device of claim 1, wherein the feature is a resource, service, entity, or property of the edge computing device, that is accessible by a client device according to characteristics of the feature.

4. The edge computing device of claim 1, wherein an instance of the token is contributed to a blockchain by the attestation provider, for verification by a client device.

5. The edge computing device of claim 1, wherein each instance of the token includes an authentication key, and wherein the authentication key is generated by a trusted execution environment of the attestation provider, to identify authenticity of the instance of the token to a client device.

6. The edge computing device of claim 1, wherein an instance of the token is generated by a single-sign-on (SSO) server of the attestation provider, wherein the token is communicated using an SSO payload provided by the SSO server.

7. The edge computing device of claim 1, wherein the instructions further configure the processing circuitry to perform operations to:

perform the verification of the user instance of the token with the provider instance of the token; and in response to failure of the verification, initiate operations to re-attest the state of the feature, wherein the attestation provider provides a provider instance of an updated token to the edge computing device and a user instance of the updated token to the prospective user of the feature;

wherein the operations to provide access to the feature based on verification of the data of the user instance of the token are provided based on verification of data of the user instance of the updated token with data of the provider instance of the updated token.

8. The edge computing device of claim 1, wherein the instructions further configure the processing circuitry to perform operations to:

in response to success of the verification, transmit a result to the prospective user of the feature, based on use of the accessible feature.

9. The edge computing device of claim 1, wherein the prospective user of the feature is a user equipment, the user equipment being connected to provide the request to the edge computing device using the edge computing system, wherein the request is provided as part of a workload that uses the feature.

10. The edge computing device of claim 9, wherein the user instance of the token is assigned to the user equipment, from an orchestrator of the edge computing system, in connection with usage of the feature according to a service level agreement (SLA) established in the edge computing system, and wherein the orchestrator associates the token with the SLA based on the attestation of the accessible feature as established by the attestation provider.

11. The edge computing device of claim 9, wherein the edge computing system is a Mobile Access Edge Computing (MEG) system operating according to a MEG specification, wherein the edge computing device is a MEC host, and wherein the feature is a MEC resource accessible within the MEG host.

12. The edge computing device of claim 1, further comprising:

a storage device, wherein the provider instance of the token is stored locally at the edge computing device using the storage device.

13. At least one non-transitory machine-readable storage medium comprising instructions, wherein the instructions, when executed by a processing circuitry of an edge computing device operable in an edge computing system, cause the processing circuitry to perform operations that:

request a token from an attestation provider, wherein the attestation provider associates data in the token with an attested state of an accessible feature of the edge computing device;

obtain, from the attestation provider, a provider instance of the token, the token representing a proof of attestation, generated by the attestation provider, of the feature of the edge computing device, wherein the provider instance of the token includes data to indicate trust level designations for the feature as attested by the attestation provider;

receive, from a prospective user of the feature, a request for use of the feature at the edge computing device, the request including a user instance of the token, wherein the user instance of the token originates from the attestation provider, wherein the user instance of the token includes the data to indicate the trust level designations for the feature as attested by the attestation provider; and provide access to the feature based on a verification of the data of the user instance of the token with the data of the provider instance of the token, the verification to confirm attestation of the trust level designations for the feature.

14. The at least one non-transitory machine-readable storage medium of claim 13, further comprising instructions to perform operations that:

validate the provider instance of the token at the edge computing device, based on expiration data associated with the provider instance of the token;

wherein operations to request the provider instance of the token are repeated, to obtain an update to the provider instance of the token associated with updated expiration data.

15. The at least one non-transitory machine-readable storage medium of claim 13, wherein the feature is a resource, service, entity, or property of the edge computing device, that is accessible by a client device according to characteristics of the feature.

16. The at least one non-transitory machine-readable storage medium of claim 13, wherein the token includes an authentication key, and wherein the authentication key is generated by a trusted execution environment of the attestation provider, to identify authenticity of the token to a client device.

17. The machine-readable storage medium of claim 13, wherein the prospective user of the feature is a user equipment, the user equipment being connected to provide the request, to the edge computing device using the edge computing system, and wherein the request is provided as part of a workload that uses the feature.

18. The machine-readable storage medium of claim 17, wherein the user instance of the token is assigned to the user equipment, from an orchestrator of the edge computing system, in connection with usage of the feature according to a service level agreement (SLA) established in the edge computing system, and wherein the orchestrator associates the token with the SLA based on the attestation of the accessible feature as established by the attestation provider.

19. A method performed by an edge computing device operable in an edge computing system, comprising:
- requesting a token from an attestation provider, wherein the attestation provider associates data in the token with an attested state of an accessible feature of the edge computing device;
- obtaining, from the attestation provider, a provider instance of the token, the provider instance of the token representing a proof of attestation, generated by the attestation provider, of the feature of the edge computing device, wherein the provider instance of the token includes data to indicate trust level designations for the feature as attested by the attestation provider;
- receiving, from a prospective user of the feature, a request for use of the feature at the edge computing device, the request including a user instance of the token, wherein the user instance of the token originates from the attestation provider, wherein the user instance of the token includes the data to indicate the trust level designations for the feature as attested by the attestation provider; and
- providing access to the feature based on a verification of the data of the user instance of the token with the data of the provider instance of the token, the verification to confirm attestation of the trust level designations for the feature.

20. The method of claim 19, further comprising:
- validating the provider instance of the token at the edge computing device, based on expiration data associated with the provider instance of the token;
- wherein requesting the provider instance of the token is repeated, to obtain an update to the provider instance of the token associated with updated expiration data.

21. The method of claim 19, wherein the feature is a resource, service, entity, or property of the edge computing device, that is accessible by a client device according to characteristics of the feature.

22. The method of claim 19, wherein each instance of the token includes an authentication key, and wherein the authentication key is generated by a trusted execution environment of the attestation provider, to identify authenticity of the instance of the token to a client device.

23. The method of claim 19, further comprising:
- performing the verification of the user instance of the token with the provider instance of the token; and
- in response to failure of the verification, initiating operations to re-attest the state of the feature, wherein the attestation provider provides a provider instance of an updated token to the edge computing device and a user instance of the updated token to the prospective user of the feature;
- wherein the operations to provide access to the feature based on verification of the data of the user instance of the token are provided based on verification of data of the user instance of the updated token with data of the provider instance of the updated token.

24. The method of claim 19, further comprising:
- transmitting a result to the prospective user of the feature, based on use of the accessible feature, in response to success of the verification, wherein the prospective user of the feature is a user equipment, the user equipment being connected to provide the request to the edge computing device using the edge computing system, and wherein the request s provided as part of a workload that uses the feature.

25. The method of claim 24, wherein the user instance of the token is assigned to the user equipment, from an orchestrator of the edge computing system, in connection with usage of the feature according to a service level agreement (SLA) established in the edge computing system, and wherein the orchestrator associates the token with the SLA based on the attestation of the accessible feature as established by the attestation provider.

* * * * *

UNITED STATES PATENT AND TRADEMARK OFFICE
CERTIFICATE OF CORRECTION

| | |
|---|---|
| PATENT NO. | : 11,425,111 B2 |
| APPLICATION NO. | : 16/683410 |
| DATED | : August 23, 2022 |
| INVENTOR(S) | : Smith et al. |

It is certified that error appears in the above-identified patent and that said Letters Patent is hereby corrected as shown below:

In the Claims

In Column 47, Line 64, in Claim 11, delete "(MEG)" and insert --(MEC)-- therefor In Column 47, Line 64, in Claim 11, delete "MEG" and insert --MEC-- therefor In Column 47, Line 67, in Claim 11, delete "MEG" and insert --MEC-- therefor In Column 48, Line 59, in Claim 17, delete "request," and insert --request-- therefor In Column 50, Line 28, in Claim 24, delete "s" and insert --is-- therefor Signed and Sealed this
Twenty-seventh Day of June, 2023

Katherine Kelly Vidal
*Director of the United States Patent and Trademark Office*